United States Patent
Bestor et al.

(10) Patent No.: US 10,455,353 B2
(45) Date of Patent: Oct. 22, 2019

(54) DEVICE, METHOD, AND SYSTEM FOR ELECTRONICALLY DETECTING AN OUT-OF-BOUNDARY CONDITION FOR A CRIMINAL ORIGANIZATION

(71) Applicant: MOTOROLA SOLUTIONS, INC, Chicago, IL (US)

(72) Inventors: Daniel R Bestor, Schaumburg, IL (US); Lin Lin, Fox River Grove, IL (US); Trent J Miller, West Chicago, IL (US); Michael D Pearce, Barrington, IL (US); Jonathan J Whitall, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 405 days.

(21) Appl. No.: 15/388,077

(22) Filed: Dec. 22, 2016

(65) Prior Publication Data

US 2018/0184239 A1 Jun. 28, 2018

(51) Int. Cl.
*H04W 4/021* (2018.01)
*G06K 9/00* (2006.01)
*H04N 7/18* (2006.01)

(52) U.S. Cl.
CPC ........ *H04W 4/021* (2013.01); *G06K 9/00496* (2013.01); *G06K 9/00771* (2013.01); *H04N 7/181* (2013.01)

(58) Field of Classification Search
CPC ....... H04W 4/021; G06Q 10/08; G06Q 50/26; H04N 7/181; G06K 9/00496; G06K 9/00771
See application file for complete search history.

(56) References Cited

U.S. PATENT DOCUMENTS

| 5,434,617 A | 7/1995 | Bianchi |
| 5,666,157 A | 9/1997 | Aviv |
| 8,682,832 B2 | 3/2014 | Brillhart et al. |
| 2008/0086349 A1 | 4/2008 | Petrie |
| 2011/0302130 A1* | 12/2011 | Lee ..................... G06F 16/7847 707/602 |
| 2012/0226974 A1 | 9/2012 | Mohan et al. |

(Continued)

OTHER PUBLICATIONS

The International Search Report and the Written Opinion, corresponding patent application No. PCT/US2017/066062 filed Dec. 13, 2017, dated Feb. 20, 2018, all pages.

*Primary Examiner* — Mehmood B. Khan
(74) *Attorney, Agent, or Firm* — Daniel R. Bestor

(57) ABSTRACT

A process for electronically detecting a criminal organization out-of-boundary condition includes first maintaining a stored first geofence definition defining a geographic area associated with a first criminal organization. One or more audio and/or video streams or RF identifiers from recording devices located outside of the first geofence definition are received. An out-of-boundary condition is then detected in the streams or identifiers in which an individual determined to be associated with the first criminal organization is detected outside of the first geofence definition. Responsive to detecting the out-of-boundary condition, causing an electronic notification of the out-of-boundary condition to be one of output and transmitted to another computing device notifying the another computing device of the out-of-boundary condition.

20 Claims, 6 Drawing Sheets

(56) References Cited

U.S. PATENT DOCUMENTS

| | | |
|---|---|---|
| 2013/0156299 A1 | 6/2013 | Zhang et al. |
| 2013/0339286 A1 | 12/2013 | Yahalom et al. |
| 2014/0016835 A1* | 1/2014 | Song .................. G10L 17/06 |
| | | 382/118 |
| 2014/0118543 A1 | 5/2014 | Kerbs et al. |
| 2014/0313330 A1* | 10/2014 | Carey ............... G06K 9/00771 |
| | | 348/143 |
| 2015/0242682 A1 | 8/2015 | Holz |
| 2016/0026252 A1 | 1/2016 | McCoy et al. |
| 2016/0042767 A1* | 2/2016 | Araya .................. G11B 19/02 |
| | | 386/201 |
| 2017/0134698 A1* | 5/2017 | Mahar .................. H04N 7/181 |
| 2017/0241660 A1* | 8/2017 | Sekar ..................... F24F 11/30 |
| 2018/0050800 A1* | 2/2018 | Boykin ............. H04N 5/23206 |

* cited by examiner

DEVICE, METHOD, AND SYSTEM FOR ELECTRONICALLY DETECTING AN OUT-OF-BOUNDARY CONDITION FOR A CRIMINAL ORIGANIZATION

BACKGROUND OF THE INVENTION

Tablets, laptops, phones, mobile or portable radios, and other mobile computing devices are now in common use by users, such as first responders, and provide these users with instant access to increasingly valuable additional information such as vehicle histories, arrest records, outstanding warrants, health information, and other information that may aid the user in making a more informed determination of an action to take or how to resolve a situation, among other possibilities. In addition, video coverage of many major metropolitan areas is reaching a point of saturation such that nearly every square foot of some cities is under surveillance by at least one static or moving camera. Currently, some governmental agencies are deploying government-owned cameras or are obtaining legal access to privately owned cameras, or some combination thereof, and are deploying command centers to monitor these cameras and review the information they produce. As the number of video feeds increases, however, it becomes difficult to review all of the video feeds being provided in real-time, such that the incremental value of such video monitoring and the ability to identify situations of concern decreases substantially.

On the other hand, organized crime, which may refer to a general category of highly centralized enterprises run by individuals with an intent to engage in illegal activity, continues to be difficult for governmental institutions to track and police. While the addition of substantial video coverage has aided some governmental institutions in recreating incidents and events leading up to those incidents, video monitoring tools and systems have not advanced to provide an ability to predict and/or prevent such incidents before they occur and electronically monitor changes in criminal organization geographic influence.

Thus, there exists a need for an improved method, device, and system for electronically detecting an out-of-boundary condition for a criminal organization and proactively and responsively notifying users and/or other electronic devices when such an out-of-boundary condition is detected.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
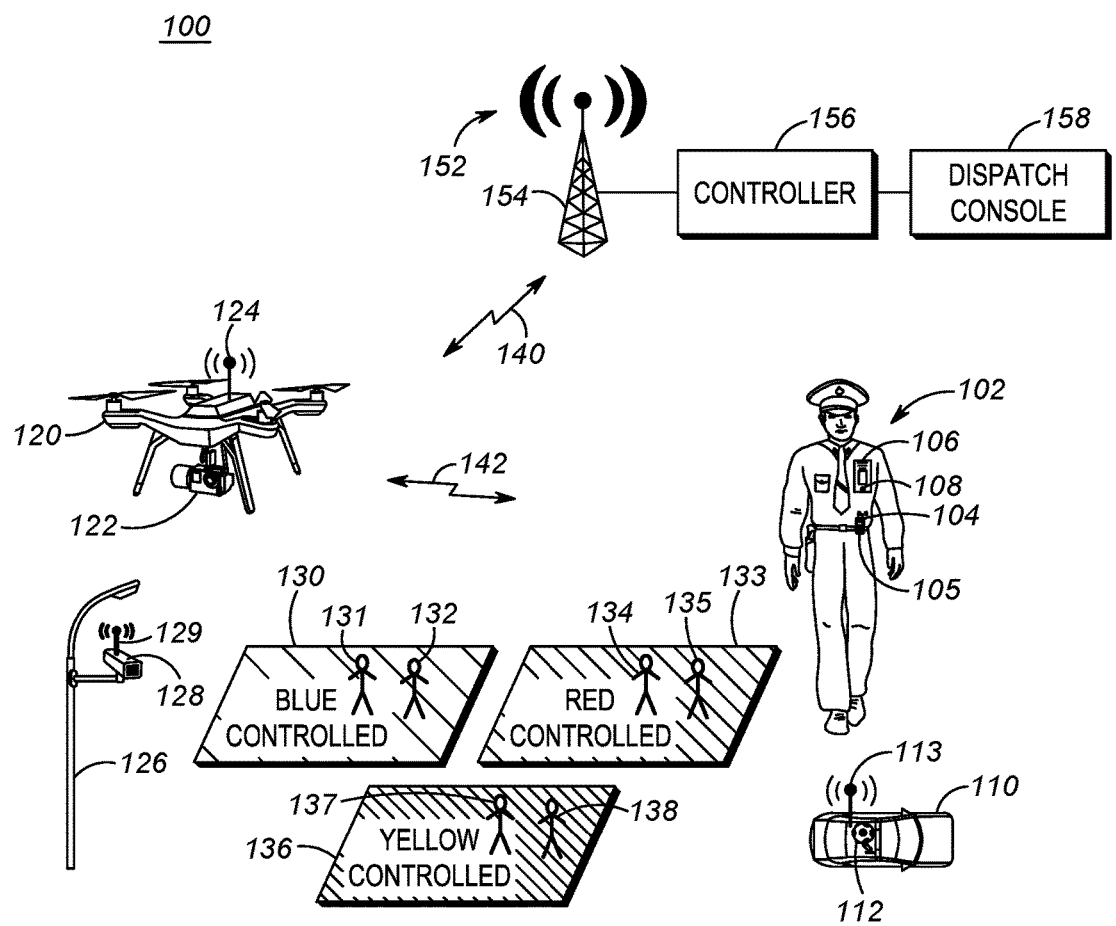
FIG. 1 is a system diagram illustrating a plan view of a system in which process steps set forth herein may be executed, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for electronically detecting an out-of-boundary condition for a criminal organization and proactively and responsively notifying users and/or other electronic devices when such an out-of-boundary condition is detected.

In One Embodiment [Claim 1 Once Approved]

In a further embodiment, a computing device for electronically detecting a criminal organization out-of-boundary condition includes: one or more non-transitory, computer-readable memories; one or more transceivers; and one or more processors that, in response to executing instructions stored in the one or more non-transitory, computer-readable memories, perform a set of functions comprising: maintain a stored first geofence definition defining a geographic area associated with a first criminal organization; receive, via the one or more transceivers, one or more audio and/or video streams or RF identifiers from one or more audio, video, and/or RF identifier recording devices located outside of the first geofence definition or having a field-of-view outside of the first geofence definition; detect, via the one or more audio and/or video streams or RF identifiers, an out-of-boundary condition in which an individual determined to be associated with the first criminal organization is detected outside of the first geofence definition; and responsive to detecting the out-of-boundary condition, cause an electronic notification of the out-of-boundary condition to be one of output at the electronic computing device and transmitted, via the one or more transceivers, to another computing device notifying the another computing device of the out-of-boundary condition.

Each of the above-mentioned embodiments will be discussed in more detail below, starting with example communication and device architectures of the system in which the embodiments may be practiced, followed by an illustration of processing steps for achieving an improved method, device, and system for electronically detecting an out-of-boundary condition for a criminal organization and proactively and responsively notifying users and/or other electronic devices when such an out-of-boundary condition is detected. Further advantages and features consistent with this disclosure will be set forth in the following detailed description, with reference to the figures.

1. Communication System and Device Structures

Referring now to the drawings, and in particular FIG. 1, a communication system diagram illustrates a system 100 of audio, video, and/or RF identifier recording devices coupled to a first officer 102, a motor vehicle 110, an autonomous unmanned aerial vehicle 120, and a light post 126 that may record audio, video, and/or radio frequency (RF) identifiers relative to a plurality of criminal organization geofences 130, 133, 136 associated with different respective criminal organizations.

Coupled to the first officer 102 is a mobile communication device 104 with an optional integrated audio and/or video recording device 105, and a radio speaker microphone (RSM) 106 with an optional integrated audio and/or video recording device 108. While the first officer 102 is illustrated in FIG. 1 as a police officer, in other embodiments, may be any type of person that may carry recording devices that may be sourced for purposes of electronically maintaining criminal organization geofences and/or electronically detecting an out-of-boundary condition associated with criminal organization geofences. For example, first officer 102 may, in other embodiments, work for other governmental and non-governmental agencies such as park districts, real estate offices, or other types of security or non-security details.

Coupled to the motor vehicle 110 is a vehicular audio and/or video recording device 112. While the audio and/or video recording device 112 is illustrated in FIG. 1 as coupled to a motor vehicle of a sedan type, in other embodiments, motor vehicle 110 may be any vehicle that includes at least one vehicle occupant for transporting the vehicle occupant via gas, electric, or some other type of propulsion, and includes a vehicular camera capable of capturing a field-of-view in an area surrounding the motor vehicle 110. For example, the motor vehicle 110 otherwise be a truck, motorcycle, scooter, van, bus, jeep, SUV, or tank, among other possibilities. Also coupled to motor vehicle 110 is a receiver, transmitter, or transceiver 113 that may act as an RF recording identifier recording device.

Coupled to the autonomous unmanned aerial vehicle 120 is an audio and/or video recording device 122. While the audio and/or video recording device 122 is illustrated in FIG. 1 as coupled to an autonomous unmanned aerial vehicle, in other embodiments, it may be coupled to a land-based autonomous drone, among other possibilities. Also coupled to autonomous unmanned aerial vehicle 120 is a receiver, transmitter, or transceiver 124 that may act as an RF identifier recording device.

And coupled to the light post 126 is a fixed audio and/or video recording device 128. While the fixed audio and/or video recording device 128 is illustrated as coupled to a light post 126, in other embodiments, it may be coupled to other structures, such as a building, street sign, or traffic light. Also coupled to light post 126 is a receiver, transmitter, or transceiver 129 that may act as an RF recording identifier recording device.

Each of the audio and/or video recording devices 105, 108, 112, 122, 128 may record audio and/or video of an associated field-of-view, and process the audio and/or video locally and/or transmit the audio and/or video to another electronic computing device (e.g., an infrastructure computing device such as controller 156, another one of the audio and/or video recording devices 105, 108, 112, 122, 128 operating as an edge-based audio and/or video processing computing device, or to a local on-scene computing device) for remote processing.

The fields-of-view recorded by the audio and/or video recording device s 105, 108, 112, 122, 128 may include areas inside of or outside of a first criminal organization geofence 130 indicated as associated with a criminal organization identified as the "Blue" criminal organization, inside of or outside of a second criminal organization geofence 133 indicated as associated with a criminal organization identified as the "Red" criminal organization, and inside of or outside of a third criminal organization geofence 136 indicated as associated with a criminal organization identified as the "Yellow" criminal organization.

The vehicular audio and/or video recording device 112 may be coupled to the receiver, transmitter, or transceiver 113 for wirelessly transmitting recorded audio and/or video to other computing devices (and/or receiving audio and/or video captured by other devices), or, in other embodiments, the vehicular audio and/or video recording device 112 may make use of a transceiver already deployed elsewhere in the motor vehicle 110.

The autonomous unmanned aerial vehicle audio and/or video recording device 122 may be coupled to the receiver, transmitter, or transceiver 124 coupled to the autonomous unmanned aerial vehicle itself (as illustrated in FIG. 1) or alternatively coupled to the audio and/or video recording device 122 for wirelessly transmitting recorded audio and/or video to other computing devices (and/or receiving audio and/or video captured by other devices).

The light post 126 audio and/or video recording device 128 may use a receiver, transmitter, or transceiver 129 coupled to the audio and/or video recording device 128 itself (as illustrated in FIG. 1) or alternatively may use a wireless transmitter coupled to the light post 126 or a wired connection to a dispatch and control center coupled to the light post 126 for transmitting recorded audio and/or video to other computing devices (and/or receiving audio and/or video captured recorded by other devices).

The receiver, transmitter, or transceivers 113, 124, 129 may be long-range wireless receivers, transmitters, and/or transceivers that have a transmitter transmit range on the order of miles, e.g., 0.5-50 miles, or 3-20 miles (e.g., in comparison to a short-range transmitter such as a Bluetooth, Zigbee, or NFC transmitter). The long-range transmitters may implement a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitters may implement a Long Term Evolution (LTE) protocol including multimedia broadcast multicast services (MBMS) or single site point-to-multipoint (SC-PTM) or an LTE-Advanced protocol over which an open mobile alliance (OMA) push to talk (PTT) over cellular (OMA-PoC), a voice over IP (VoIP), or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard. The long-range wireless receivers, transmitters, and/or transceivers may operate in an infrastructure mode in which communications are established via infrastructure wireless link(s) 140 and/or may operate in a direct mode/ad-hoc wireless mode in which communications are established via ad-hoc wireless link(s) 142. Other types of long-range wireless protocols could be implemented as well.

The receiver, transmitter, or transceivers 113, 124, 129 may also function as RF identifier recording device in that they receive over-the-air transmitted communications and may monitor all communications (including those to which it is not an intended recipient) and may record RF source device identifiers (e.g., such as a medium access control (MAC) address, a radio identifier (ID), or other unique wireless device transmitting identifier that is used to uniquely identify a transmitting device) it receives from other devices sending communications over-the-air, and may further record information such as a direction (if an antenna array allows such information), strength of signal, and other wireless parameters associated with the recorded RF identifier. Recorded RF identifiers may be stored locally in a computer-readable storage at the respective computing device associated with receiver, transmitter, or transceivers 113, 124, 129, or reported back up to the infrastructure RAN 152 via infrastructure link(s) 140 or to another computing device via ad-hoc link(s) 142 for further processing and analysis.

The mobile computing device 104 coupled to the first officer 102 may be a battery-powered mobile radio used for narrowband and/or broadband direct-mode or infrastructure communications and may include a microphone and/or speaker for supporting private and group audio communications (in addition to the video recording device set forth above). The RSM 106 may similarly be a battery-powered (itself or via a wired connection with mobile computing device 104) mobile radio used for narrowband and/or broadband direct-mode or infrastructure communications (again, itself via a narrowband and/or broadband modem separate from the mobile computing device 104 or using a modem of the mobile communication device 104 accessed via a wired or wireless connection with the mobile computing device 104) and may similarly include a microphone and/or speaker for supporting private and group audio communications (in addition to the video recording device set forth above) that is placed closer to the first officer's 102 head.

The mobile computing device 104 and RSM 106 may each include a location determination device separately disposed in the mobile computing device 104 and RSM 106, in the respective audio and/or video recording devices 105, 108, and/or in respective receivers, transmitters, or transceivers of the mobile computing device 104 and RSM 106 for determining a location of the mobile computing device 104 and RSM 106 (and their respective audio and/or video recording devices 105, 108 and their respective receivers, transmitters, or transceivers). The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope, which is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Each orientation may additionally or alternatively include a magnetometer. A magnetometer is a device used to measure the strength and/or direction of the magnetic field in the vicinity of the device, and can be used to determine a direction in which a person or device is facing. Other types of orientation sensors could be used as well. The location can then be stored locally or transmitted via the transmitter or transceiver to other computing devices, perhaps for use in determining a location of audio, video, and/or RF identifiers recorded by the respective audio and/or video recording devices 105, 108 or receivers or transceivers.

The mobile computing device 104 and RSM 106 may each include a long-range wireless receiver, transmitter, and/or transceiver same or similar to the long-range wireless receiver, transmitter, and/or transceiver already discussed above with respect to receivers, transmitters, or transceivers 113, 124, 129. The mobile computing device 104 and RSM 106 may each additionally include a short-range receiver, transmitter (e.g., in comparison to the long-range transmitter such as a LMR or Broadband transmitter), and/or transceiver for wirelessly coupling with each other and/or other computing devices. The short-range receiver, transmitter, and/or transceiver may be Bluetooth, Zigbee, or NFC having a transmit range on the order of 0.01-100 meters, or 0.1-10 meters. Either or both of the long-range wireless receiver or transceiver and the short-range receiver or transceiver may also function as an RF identifier recording device same or similar to that already described earlier. RF identifiers recorded via either of the short-range receiver or transceiver or long-range receiver or transceiver may be stored in computer-readable storage at the respective mobile computing device 104 and RSM 106, or reported back up to the infrastructure RAN 152 via infrastructure link(s) 140 or to another computing device via ad-hoc link(s) 142 for further processing and analysis, The RSM 106 provides voice functionality features similar to a traditional RSM, including one or more of acting as a remote microphone that is closer to the first officer's 102 mouth, providing a remote speaker allowing play back of audio closer to the first officer's 102 ear, and including a push-to-talk (PTT) switch or other type of PTT input. The voice and/or audio recorded at the remote microphone may be provided to the mobile computing device 104 for further transmission to other computing devices or the infrastructure RAN or may be directly transmitted by the RSM 106 to other computing devices or the infrastructure RAN. The voice and/or audio played back at the remote speaker may be received from the mobile computing device 104 or directly from one or more other computing devices or the infrastructure RAN. The RSM 106 may include a separate physical PTT switch that functions, in cooperation with the mobile computing device 104 or on its own, to maintain the mobile computing device 104 and/or RSM 106 in a monitor only mode, and which switches the device or devices to a transmit-only mode (for half-duplex devices) or transmit and receive mode (for full-duplex devices) upon depression or activation of the PTT switch. The mobile computing device 104 and/or RSM 106 may form part of a group communications architecture that allows a single mobile computing device to communicate with one or more group members (not shown) associated with a particular group of mobile communications devices at a same time.

Additional features may be provided at the RSM 106 as well. For example, a display screen may be provided for displaying images, video, and/or text to the first officer 102. The display screen may be a liquid crystal display (LCD) screen or an organic light emitting display (OLED) display screen. In some embodiments, a touch sensitive input interface may be incorporated into the display screen as well, allowing the first officer 102 to interact with content provided on the display screen. A soft PTT input may also be provided via such a touch interface.

The vehicular audio and/or video recording device 112 may be an imaging device capable of recording video in a corresponding area of interest surrounding a portion of the motor vehicle 110. The vehicular audio and/or video recording device 112 may include a directional or unidirectional microphone to record audio surrounding the motor vehicle 110. The vehicular audio and/or video recording device 112 may include video capture capabilities via a 360° vehicular video camera or via other types of vehicular video cameras having a combined field-of-view of greater than 60°, greater than 120°, or greater than 320°. In an embodiment in which a single vehicular imagine device provides the field-of-view, the single vehicular imaging device may be a vehicular video camera system including sufficient optical imaging devices to cover the field-of-view noted above, may be a scanning system in which a mechanical system causes a single or reduced count of optical imaging devices to mechanically move at a periodic pace and provide the field-of-view indicated (e.g., such as scanning the field-of-view one or more times per second), or may include one or more pan, tilt, zoom cameras that can be mechanically positioned to provide the field-of-view noted above. In an embodiment in which a plurality of physically separate vehicular imaging devices are combined to provide the field-of-view noted above, the plurality of separate vehicular imaging devices may be pre-configured or dynamically set (under control of a controller at one of the one or more vehicular imaging devices or a vehicular computing device, for example) to provide substantially non-overlapping or minimally overlapping fields-of-view that, in totality, provide the field-of-view noted above, and may be combined optically or digitally at the vehicular computing device noted above or at one or more of the plurality of separate vehicular imaging devices, among other possibilities.

The vehicular audio and/or video recording device 112 may be continuously on, may periodically take audio and/or video at a regular cadence, or may be trigged to begin capturing audio and/or video as a result of some other trigger, as will be discussed in more detail below. The vehicular audio and/or video recording device 112 may include underlying CMOS or CCD imager(s), for example, for digitally capturing images and/or video of a corresponding area of interest surrounding the motor vehicle 110.

Audio, and/or video recorded at the vehicular audio and/or video recording device 112 may be stored at the vehicular audio and/or video recording device 112 itself, may be transmitted to a separate storage or computing device via a wired connection with the vehicular computing device, or may be transmitted to other devices outside of the motor vehicle 110 as noted earlier via receiver, transmitter, or transceiver 113. While vehicular audio and/or video recording device 112 is illustrated in FIG. 1 as affixed to a top of the motor vehicle 110, in other embodiments, the vehicular audio and/or video recording device 112 may be affixed to another location on the motor vehicle 110, or multiple other locations on the motor vehicle 110.

The vehicular computing device may be disposed in the motor vehicle 110, in the vehicular audio and/or video recording device 112, and/or with the receiver, transmitter, or transceiver 113 for processing audio and/or video produced by the vehicular audio and/or video recording device 112 and controlling messaging sent and received via the receiver, transmitter, or transceiver 113. A location determination device may be disposed in the motor vehicle 110, in the audio and/or video recording device 112, and/or with the receiver, transmitter, or transceiver 113 for determining a location of the motor vehicle 110, audio and/or video recording device 112, or receiver, transmitter, or transceiver 113 (when acting as an RF identifier recording device). The location determination device may be the same or similar to, and provide the same or similar functionality as, the location determination device noted above with respect to the mobile communications device 104 and RSM 106.

The autonomous unmanned aerial vehicle 120 may be a camera-equipped flight-capable airborne drone having an electro-mechanical drive element, an audio and/or video recording device 122, and a microprocessor that is capable of taking flight under its own control, under control of a remote operator, or some combination thereof, and taking images and/or video of a region or regions of interest surrounding the autonomous unmanned aerial vehicle 120 prior to, during, or after flight. The audio and/or video recording device 122 may be an imaging device attached to the autonomous unmanned aerial vehicle 120 fixed in its direction (and thus rely upon repositioning of the autonomous unmanned aerial vehicle 120 it is attached to for camera positioning) or may be an imaging device including a pan, tilt, zoom motor for independently controlling pan, tilt, and zoom features of the imaging device. The autonomous unmanned aerial vehicle 120, while depicted in FIG. 1 as an airborne drone, could additionally or alternatively be a ground-based unmanned motor vehicle, among many other possibilities. The audio and/or video recording device 122 attached to the autonomous unmanned aerial vehicle 120 may be continuously on, may periodically take images at a regular cadence, or may be trigged to begin capturing audio, images, and/or video as a result of some other action, such as the autonomous unmanned aerial vehicle 120 being dispatched to a particular area of interest or dispatched with instructions to monitor a status of a criminal organization geofence and/or associates of the criminal organization. The audio and/or video recording device 122 may be an imaging device including a CMOS or CCD imager, for example, for digitally capturing images and/or video.

The audio and/or video recording device 122 may further include a directional or unidirectional microphone to record audio surrounding the autonomous unmanned aerial vehicle 120. Audio and/or video recorded at the audio and/or video recording device 122 may be stored and/or processed at the audio and/or video recording device 122, at the autonomous unmanned aerial vehicle 120, and/or may be transmitted to a separate storage or computing device outside of the autonomous unmanned aerial vehicle 120 via receiver, transmitter, or transceiver 124 as noted earlier.

The flight control microprocessor or an additional electronic processor may be disposed in the autonomous unmanned aerial vehicle 120, in the audio and/or video recording device 122, and/or with the receiver, transmitter, or transceiver 124 for processing audio and/or video produced by the audio and/or video recording device 122, RF identifiers produced by the receiver or transceiver, and controlling messaging sent and received via the receiver, transmitter, or transceiver 124. A location determination device may be similarly disposed in the autonomous unmanned aerial vehicle 120, in the audio and/or video recording device 122, and/or with the receiver, transmitter, or transceiver 124 for determining a location of the autonomous unmanned aerial vehicle 120, the audio and/or video recording device 122, and/or the receiver, transmitter, or transceiver 124 (when acting as an RF identifier recording device). The location determination device may be the same or similar as, and provide same or similar functionality to, the location determination device noted above with respect to the mobile communications device 104 and the RSM 106.

The fixed audio and/or video recording device 128 attached to light post 126 may be any device capable of capturing audio and/or video in a corresponding area of interest surrounding the light post 126. The fixed audio and/or video recording device 128 is fixed in the sense that it cannot physically move itself in any significant direction (e.g., more than one foot or one inch in any horizontal or vertical direction). However, this does not mean that it cannot pan, tilt, or zoom at its fixed location to cover a larger corresponding area of interest than without such pan, tilt, or zoom. The fixed audio and/or video recording device 128 may be continuously on, may periodically take images at a regular cadence, or may be trigged to begin capturing audio and/or video as a result of some other action, such as detection of an instruction or command or upon receipt of an instruction to do so from another electronic computing device. The fixed audio and/or video recording device 128 may be an imaging device including a CMOS or CCD imager, for example, for digitally capturing images and/or video of a corresponding area of interest. The audio and/or video recording device 128 may further include a directional or unidirectional microphone to record audio surrounding the fixed audio and/or video recording device 128.

Audio and/or video recorded at the fixed audio and/or video recording device 128 may be stored and/or processed at the fixed audio and/or video recording device 128 itself, and/or may be transmitted to a separate storage or computing device outside of the light post 126 via a wired connection through the light post 126 (and city network), or via the receiver, transmitter, or transceiver 124.

An additional electronic processer may be disposed in the light post 126, in the fixed audio and/or video recording device 128, and/or with the receiver, transmitter, or transceiver 129 for processing audio and/or video produced by the fixed audio and/or video recording device 128, RF identifiers produced by the receiver or transceiver 129, and controlling messaging sent and received via the receiver, transmitter, or transceiver 129. A location determination device may be disposed in the light post 126, in the fixed audio and/or video recording device 128, and/or with the receiver, transmitter, or transceiver 129 for determining a location of the light post 126, fixed audio and/or video recording device 128, or receiver, transmitter, or transceiver 129. The location determination device may be the same or similar to, and provide a same or similar function as, the location determination device noted above with respect to the mobile communications device 104 and RSM 106.

In other embodiments, because the fixed audio and/or video recording device 128 is fixed in its location, receiving computing devices that can uniquely identify the fixed audio and/or video recording device 128 and/or the light post 126 may be able to alternatively determine a location of audio and/or video produced by the fixed audio and/or video recording device 128 by simply referencing a known fixed location mapping relative to the identity of the light post 126 or fixed audio and/or video recording device 128. Other possibilities exist as well.

Although first officer 102, motor vehicle 110, light post 126, and autonomous unmanned aerial vehicle 120 are illustrated in FIG. 1 as providing example audio and/or video and RF identifier recording devices for identifying or electronically detecting an out-of-boundary condition for a criminal organization and for electronically maintaining geofences associated with criminal organizations consistent with the remainder of this disclosure, other types of audio and/or video and RF identifier recording devices could be used as well, including but not limited to, audio and/or video and RF identifier recording devices secured to traffic lights, automated teller machine (ATM) video cameras, land or water-based drone-attached video cameras, or other types of audio, video, and/or RF identifier recording devices accessible via a wired or wireless network interface same or similar to that disclosed herein.

Infrastructure RAN 152 may implement over wireless link(s) 140 a conventional or trunked LMR standard or protocol such as DMR, a P25 standard defined by the APCO, TETRA, or other LMR radio protocols or standards. In other embodiments, infrastructure RAN 152 may additionally or alternatively implement over wireless link(s) 140 an LTE or LTE-Advanced protocol including MBMS or SC-PTM over which an OMA-PoC, a VoIP, or a PoIP application may be implemented. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the mobile computing device 104, RSM 106, motor vehicle 110 receiver, transmitter, or transceiver 113, autonomous unmanned aerial vehicle 120 receiver, transmitter, or transceiver 124, and fixed camera 128 receiver, transmitter, or transceiver 129 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. The controller 156 may additional or alternatively operate as a back-end audio and/or video processing computing device, electronic geofence maintenance computing device, and/or electronic out-of-boundary detection computing device consistent with the remainder of this disclosure.

Ad-hoc or direct mode wireless link(s) 142 may implement direct mode LMR standard or protocol such as DMR, a P25 standard defined by the APCO, TETRA, or other direct mode LMR radio protocols or standards. In other embodiments, wireless link(s) 142 may additionally or alternatively implement a direct mode LTE protocol (such as proximity-based service (ProSe)) that may support an OMA-PoC, a VoIP, or a PoIP application. In still further embodiments, wireless link(s) 142 may additionally or alternatively implement an ad-hoc Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well.

Each of the criminal organization geofences 130, 133, 136 illustrated in FIG. 1 is a geofence defined by a geofence definition and associated with a particular criminal organization. Each geofence definition may include a unique electronic geofence identifier and a respective electronic geographic definition defining geographic boundaries of the geofence. Each geofence definition may also include, or a separate table linked to each unique geofence identifier may set forth, an identity of a particular criminal organization associated with the respective geographic definition included in the geofence definition. Individual geofence definitions may be entirely separate, may share one or more borders, or may be partially overlapping (e.g., where control over a geographic region may be in dispute).

A geographic definition in each geofence definition may take the form of a set of three or more polygon vertices, where each polygon vertex is a GPS coordinate, such as a latitude and longitude pair, or some other form of cartographic definition. Additionally or alternatively, geographic definitions may take the form of a point and radius, where the radius is a distance criterion and the point is a GPS coordinate, such as a latitude and longitude pair, or some other form of cartographic definition. Further, geographic definitions may take the form of a set of two diagonally opposing rectangular vertices, where each rectangular vertex is a GPS coordinate, such as a latitude and longitude pair, or some other form of cartographic definition. Still further, geographic definitions mat take the form of a set of bounding streets, roads, rivers, and/or other geographic features that fully define the boundaries of the geofence definition. Other possibilities for electronic data structures for storing same or similar information could be used as well.

Geofence definitions may be stored centrally at an infrastructure computing device, such as controller 156 of FIG. 1, may be distributively stored at the first officer's 102 mobile computing device 104, the first officer's RSM 106, the motor vehicle's 110 computing device, the autonomous unmanned aerial vehicle's 120 computing device, the light post's 126 computing device, at audio, video, and/or RF identifier recording devices 105, 108, 112, 113, 122, 124, 128, 129 or at various combinations of the foregoing. As updates to geofence definitions are made, they may be updated at the stored central location, or pushed as updates to each of the one or more distributed computing devices noted above as well.

A first geofence definition of the first criminal organization geofence 130 may include a unique geofence identifier (e.g., of "1" or "Blue") and a respective geographic definition defining the geographic boundaries illustrated in FIG. 1 forming a rhombus shape. A criminal organization identified as "Blue" and associated with the first criminal organization geofence 130 may be stored as the unique geofence identifier in the first geofence definition or may be stored separately and may reference the unique geofence identifier (perhaps "1") of the first criminal organization geofence 130. Illustrated within the first criminal organization geofence 130 are two known associates of the "Blue" criminal organization, including a first "Blue" associate 131 and a second "Blue" associate 132. While each criminal associate in the figures is drawn as an individual civilian that is known (somewhere, to someone) to have a criminal association with their respective criminal organization, in various examples below, these associations may or may not already be known by computing devices processing audio, video, and/or RF identifiers of individuals that may or may not be associates of criminal organizations.

Figure 6:
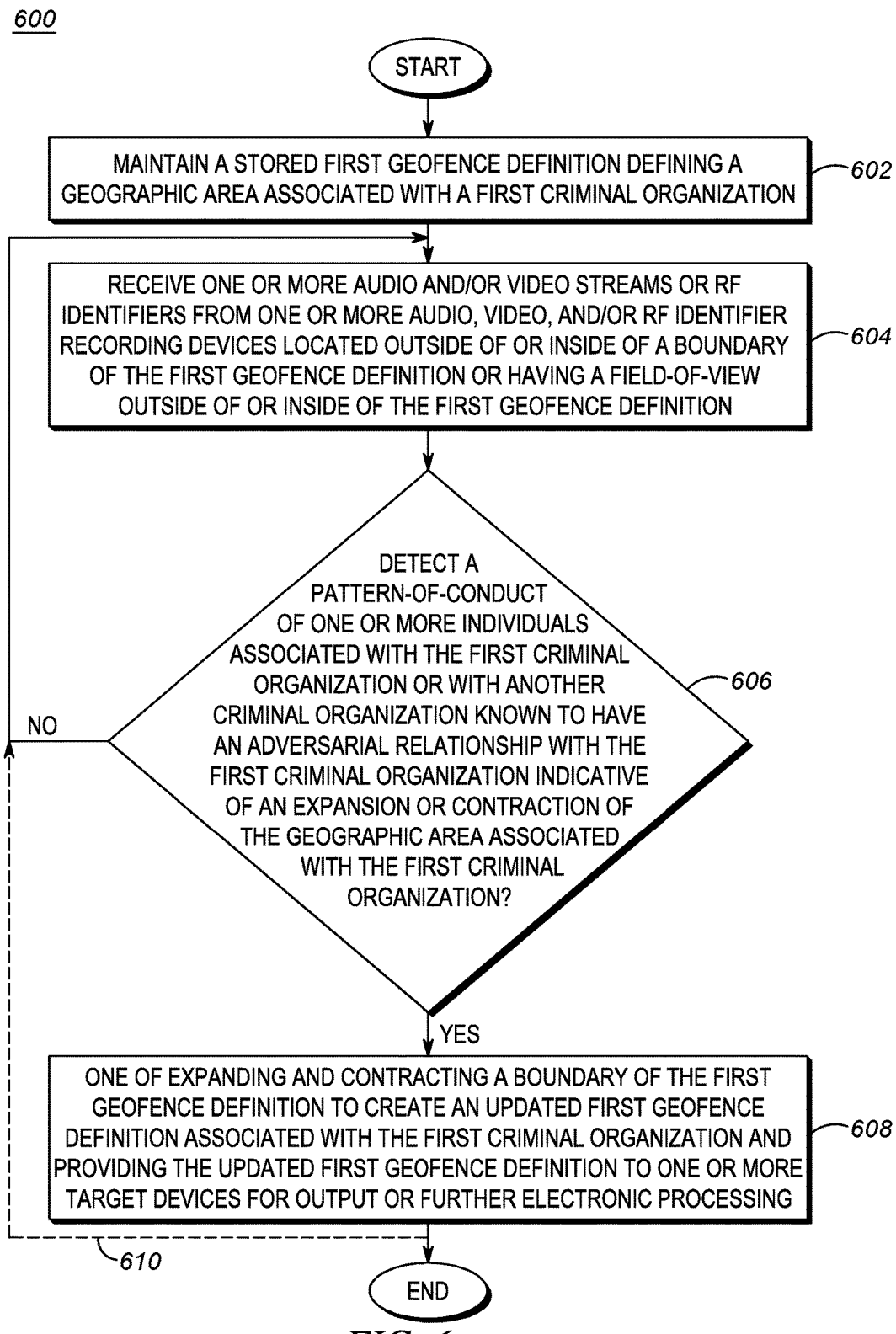
FIG. 6 illustrates a flow chart setting forth process steps for electronically maintaining one or more criminal organization geofences as various electronically detected patterns-of-conduct of one or more criminal organization associates is or are detected, in accordance with some embodiments.

The boundaries of the first criminal organization geofence 130 may be initially set by a user such as the first officer 102 entering the boundaries of the first criminal organization geofence 130 into one of the electronic computing devices noted above (such as the mobile computing device 104 or dispatch console 158), and/or may be built up intelligently over time (and continuously modified thereafter) in accordance with a process such as that set forth with respect to FIG. 6 below. The boundaries of the first criminal organization geofence 130 may then be made accessible to other computing devices or actively provided to each of the one or more computing devices noted above. Additionally or alternatively, the boundaries may be initially entered by an agency administrator at a computing device with an agency infrastructure network (such as dispatch console 158 of FIG. 1), and then provided or may accessible to other computing device at any time, such as at power-on, upon request by a user, or on-demand as the other computing device approaches one of the boundaries.

A second geofence definition of the second criminal organization geofence 133 may include a unique geofence identifier (e.g., of "2" or "Red") and a respective geographic definition defining the geographic boundaries illustrated in FIG. 1 forming another rhombus shape. A criminal organization identified as "Red" and associated with the second criminal organization geofence 133 may be stored as the unique geofence identifier in the second geofence definition or may be stored separately and may reference the unique geofence identifier (perhaps "2") of the second criminal organization geofence 133. Illustrated within the second criminal organization geofence 133 are two known associates of the "Red" criminal organization, including a first "Red" associate 134 and a second "Red" associate 135. The boundaries of the second criminal organization geofence 133 may be initially set and/or shared in a similar manner to that set forth above with respect to the first criminal organization geofence 130.

Finally, a third geofence definition of the third criminal organization geofence 136 may include a unique geofence identifier (e.g., of "3" or "Yellow") and a respective geographic definition defining the geographic boundaries illustrated in FIG. 1 forming a final rhombus shape. A criminal organization identified as "Yellow" and associated with the third criminal organization geofence 136 may be stored as the unique geofence identifier in the third geofence definition or may be stored separately and may reference the unique geofence identifier (perhaps "3") of the third criminal organization geofence 136. Illustrated within the third criminal organization geofence are two known associates of the "Yellow" criminal organization, including a first "Yellow" associate 137 and a second "Yellow" associate 138. The boundaries of the third criminal organization geofence 136 may be initially set and/or shared in a similar manner to that set forth above with respect to the first criminal organization geofence 130.

Figure 2:
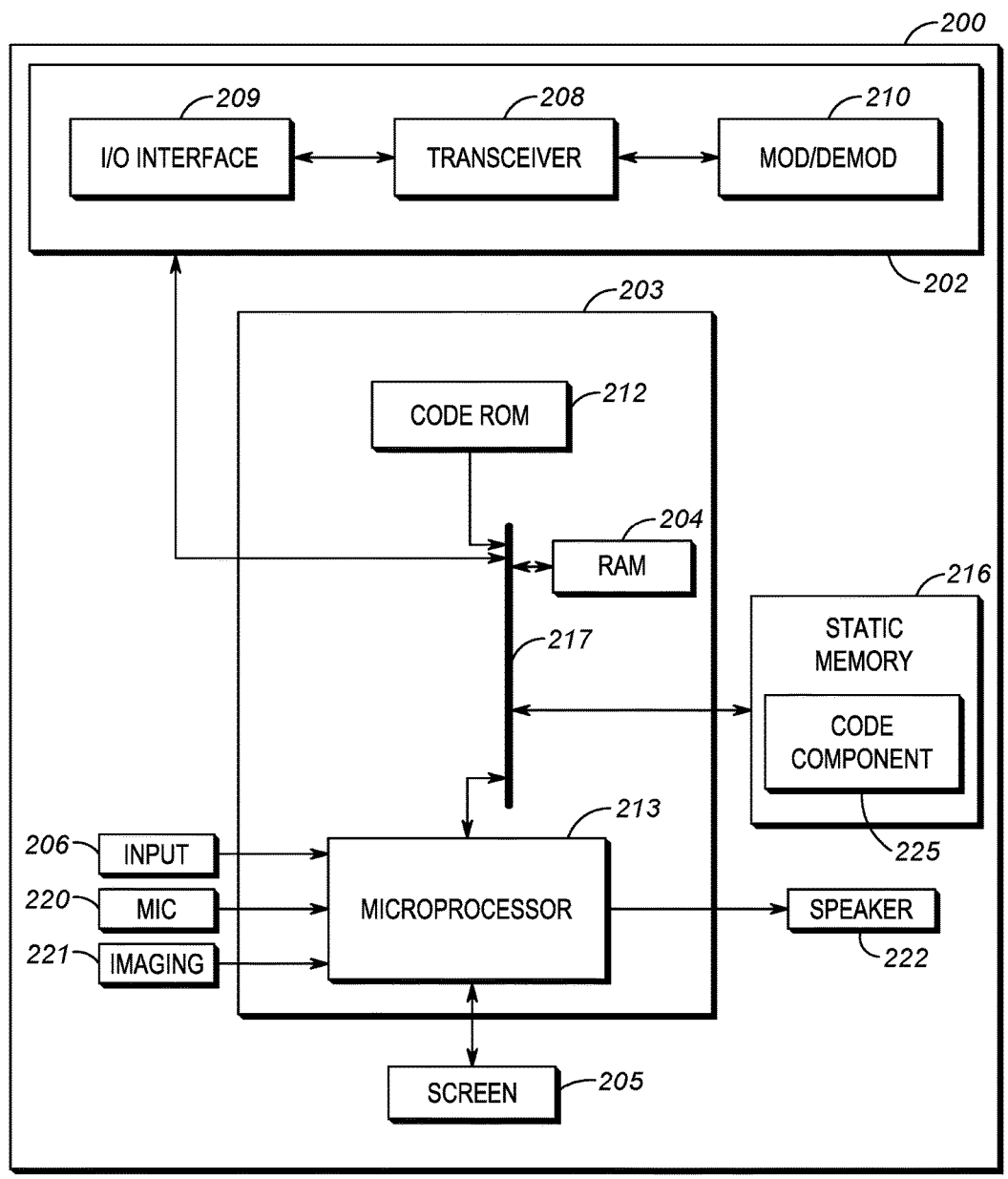
FIG. 2 is a device diagram showing a device structure of an electronic computing device, in accordance with some embodiments.

Referring to FIG. 2, a schematic diagram illustrates an electronic computing device 200 according to some embodiments of the present disclosure. Electronic computing device 200 may be, for example, the same as or similar to the mobile computing device 104, RSM 106, the motor vehicle's 110 electronic computing device, the autonomous unmanned aerial vehicle's 120 computing device, the light post's 126 computing device, and/or audio, video, and/or RF identifier recording devices 105, 108, 112, 113, 122, 124, 128, 129 or may be a distributed computing device across two or more of the foregoing and linked via wired and/or wireless communication link(s). As shown in FIG. 2, computing device 200 includes a communications unit 202 coupled to a common data and address bus 217 of a processing unit 203. The computing device 200 may also include an input unit (e.g., keypad, pointing device, touch-sensitive surface, etc.) 206 and a display screen 205, each coupled to be in communication with the processing unit 203.

A microphone 220 may be present for capturing audio from a user, or a criminal associate, that is further processed by processing unit 203 in accordance with the remainder of this disclosure and/or is transmitted as voice stream data by communication unit 202 to other computing devices. An imaging device 221 may provide images and/or video of an area in a field-of-view of the computing device 200 that may include a criminal associate for further processing by the processing unit 203. A communications speaker 222 may be present for reproducing audio that is decoded from voice streams of voice calls received via the communication unit 202 from other mobile or portable radios, for example, or may play back alert tones or other types of pre-recorded audio.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other computing devices, such as a portable radio, tablet, wireless RAN, dispatch console, unmanned autonomous aerial vehicle, and/or motor vehicle.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, an LTE-advanced transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210. Transceiver 208 (or, in other embodiments, simply a receiver) may also function as an RF identifier recording device consistent with the foregoing description.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the computing device steps set forth in FIG. 3 and accompanying text and/or set forth in FIG. 6 and accompanying text. Static memory 216 may also store, permanently or temporarily, geofence definitions associated with criminal organization geofences, identities of criminal organizations associated with each geofence definition, identifications of relationship criterions between criminal organizations represented by the geofence definitions, target devices subscribed to receive updates to geofence definitions (or related information), location information associated with the electronic computing device 200 determined via a location determination device (not shown in FIG. 2) or via a wireless transceiver of the I/O interface 209 using a triangulation technique, location information received from other computing devices or audio, video, and/or RF identifier recording devices, and criminal organization characteristics for identifying an individual's membership in a particular criminal organization (e.g., detectable via audio, video, and/or RF identifier recording and electronic processing), among other possibilities.

Static memory 216 may comprise, for example, a harddisk drive (HDD), an optical disk drive such as a compact disk (CD) drive or digital versatile disk (DVD) drive, a solid state drive (SSD), a tape drive, a flash memory drive, or a tape drive, to name a few.

Figure 3:
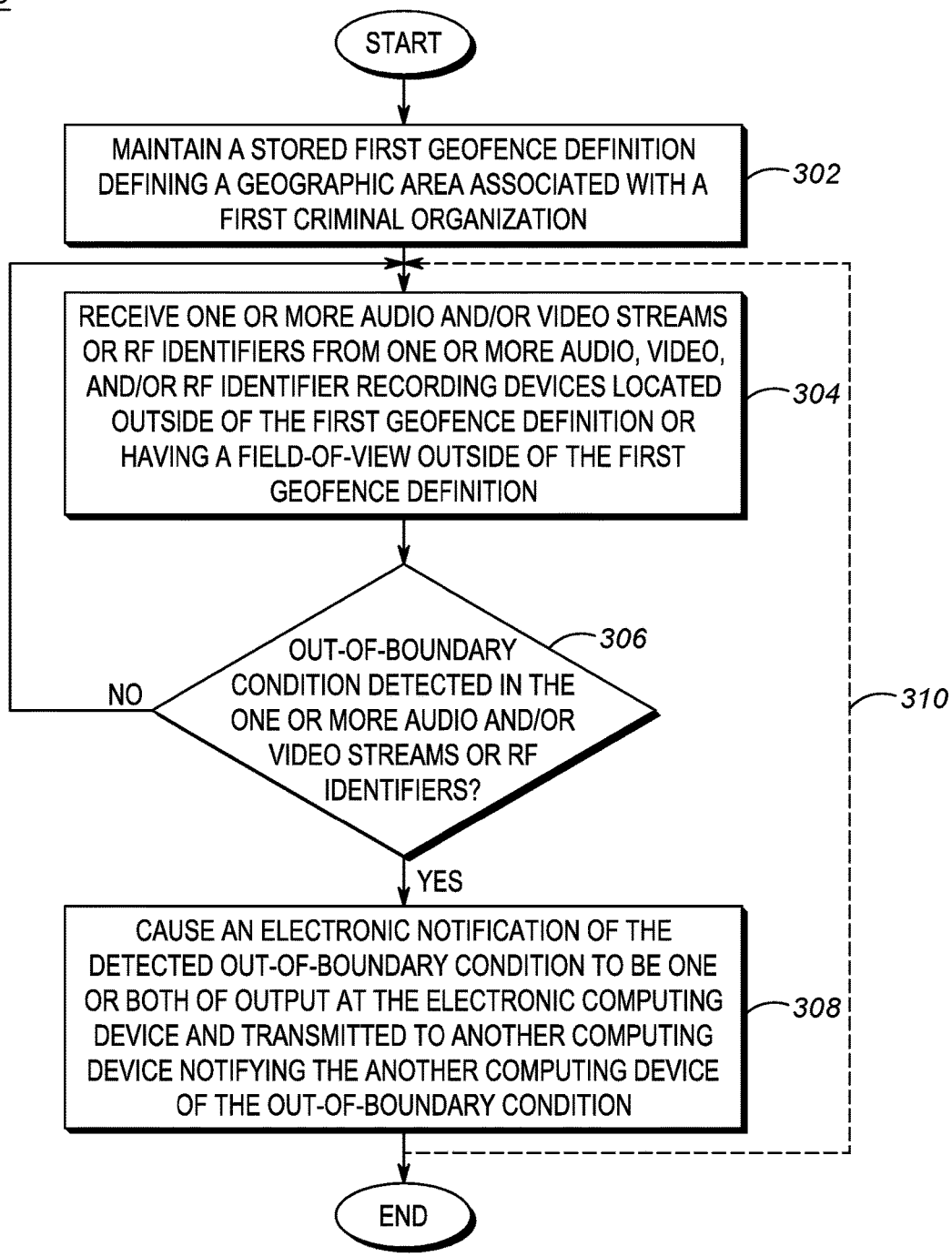
FIG. 3 illustrates a flow chart setting forth process steps for electronically detecting an out-of-boundary condition of an associate of a criminal organization and proactively and responsively notifying users and/or other computing devices when such an out-of-boundary condition is electronically detected, in accordance with some embodiments.

2. Processes for Operating an Electronic Computing Device to Electronically Detect and Respond to a Criminal Organization Out-of-Boundary Condition Turning now to FIG. 3, a flow chart diagram illustrates a method 300 for electronically detecting an out-of-boundary condition for a criminal organization and proactively and responsively notifying users and/or other electronic devices when such an out-of-boundary condition is detected. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. An electronic computing device may execute method 300 at power-on, at some predetermined periodic time period, in response to a trigger raised locally at the device via an internal process or via an input interface, or in response to receiving a wirelessly or wiredly transmitted trigger from a remote device such as a mobile or portable radio, an autonomous unmanned aerial vehicle, a fixed camera, or an infrastructure controller, among other possibilities.

Figure 4:
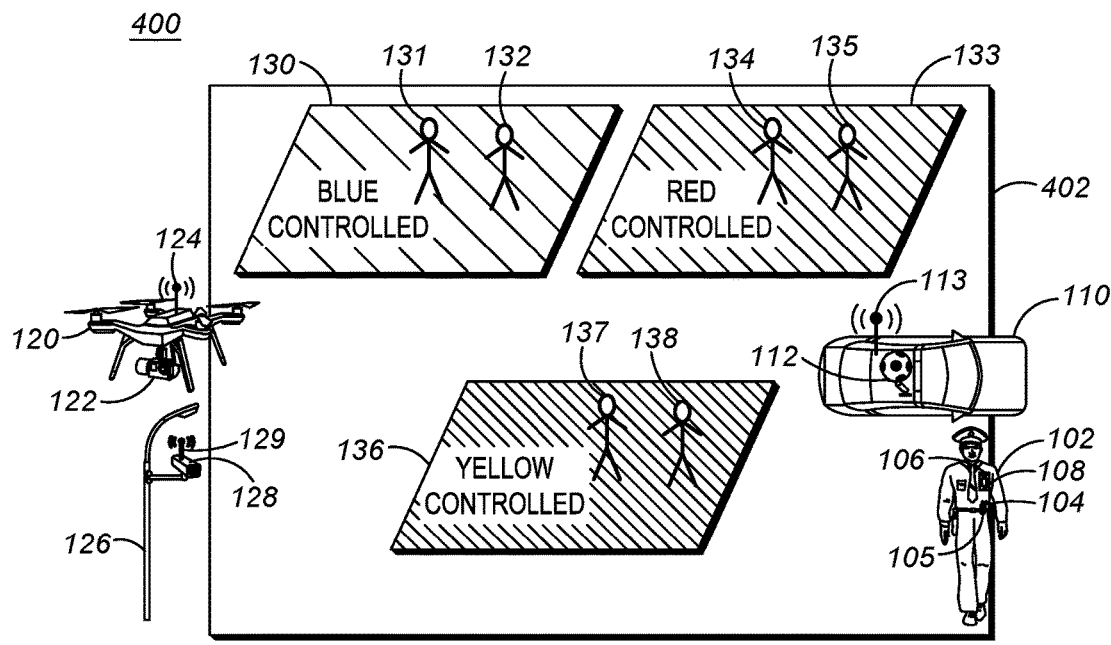
FIG. 4 illustrates a plan view of an initial state of a plurality of criminal organization geofences and associates of criminal organizations in accordance with an embodiment.
Figure 5:
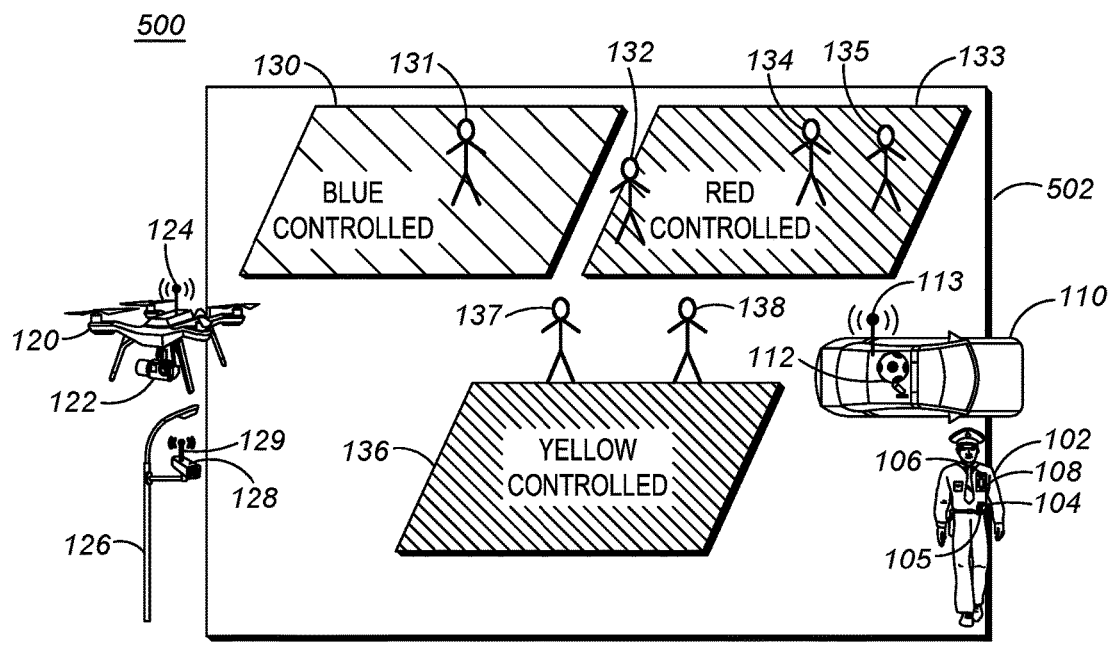
FIG. 5 illustrates a plan view of a subsequent state of the plurality of criminal organization geofences and associates of criminal organizations, in accordance with some embodiments.

The electronic computing device executing method 300 may include an edge device same or similar to any one or more of the first officer's 102 mobile computing device 104 of FIG. 1, the first officer's RSM 106, the motor vehicle's 110 electronic computing device, the autonomous unmanned aerial vehicle's 120 electronic computing device, the light post's 126 electronic computing device, or at audio, video, and/or RF identifier recording devices 105, 108, 112, 122, 128, at an infrastructure computing device same or similar to the controller 156 or disposed elsewhere in another network, or at a combination of two or more of the foregoing. FIGS. 4 and 5 illustrate plan views of an initial and a subsequent state of a plurality of criminal organization geofences and criminal organization associates and will be referenced relative to particular steps of method 300 for further clarity.

Method 300 of FIG. 3 begins at step 302, where an electronic computing device maintains a stored first geofence definition of a first criminal organization geofence defining a geographic area associated with a first criminal organization. Each geofence definition stored at the electronic computing device defines an area associated with a criminal organization, and may take a form and may be generated and/or maintained in a same or similar to that already set forth above and perhaps as described below with respect to FIG. 6.

For example, the first geofence definition maintained at step 302 may be a geofence definition defining the first criminal organization geofence 130 of FIG. 4 and associated with the "Blue" criminal organization. For exemplary purposes only, the electronic computing device may also maintain second and third geofence definitions defining second and third criminal organization geofences 133, 136 associated with the "Red" and "Yellow" criminal organizations, respectively.

At step 304, the electronic computing device receives one or more audio and/or video streams or RF identifiers from one or more audio, video, and/or RF identifier recording devices located outside of the first geofence definition, or (for video streams) having a field-of-view outside of the first geofence definition.

The device or devices generating the audio and/or video streams or RF identifiers and providing it to the electronic computing device may be the electronic computing device itself or another device communicably coupled to the electronic computing device, and may include any one or more audio, video, and/or RF identifier recording devices other than the electronic computing device and having a known location, such as any one or more of the audio, video, and/or RF identifier recording devices 105, 108, 112, 122, 128 described above with respect to FIG. 1.

In the case of mobile audio, video, and/or RF identifier recording devices, the audio and/or video streams or RF identifiers received at step 304 may be accompanied by location information indicating a geographic location at which the audio and/or video stream or RF identifiers was produced (e.g., a determined location of the electronic computing device itself if the audio and/or video stream or RF identifiers is recorded by the electronic computing device, or a wirelessly or wiredly received location information from some other audio, video, and/or RF identifier recording device that generated the audio and/or video stream or from a computing device coupled to the other audio, video, and/or RF identifier recording device), and in some embodiments including orientation information as well, so that the electronic computing device can subsequently make a determination of where the audio, video, and/or RF identifier recording device producing the audio and/or video stream or RF identifiers was located or was facing relative to known criminal organization geofences. In the case of fixed audio, video, and/or RF identifier recording devices, location information (and perhaps orientation information as well) may be provided to the electronic computing device by the audio, video, and/or RF identifier recording device producing the audio and/or video stream or RF identifiers received at step 304 in a similar manner as the mobile audio, video, and/or RF identifier recording device, or the electronic computing device may use a unique identifier provided by the fixed audio, video, and/or RF identifier recording device producing the audio and/or video stream or RF identifiers received at step 304 uniquely identifying the audio, video, and/or RF identifier recording device and may access a location mapping that maps unique identifiers to known fixed locations of audio, video, and/or RF identifier recording devices to determine a location of the fixed audio, video, and/or RF identifier recording device at step 304.

Additionally or alternatively, device or devices generating the audio and/or video streams or RF identifiers and providing it to the electronic computing device may be audio, video, and/or RF identifier recording device providing field-of-view information identifying field-of-view parameters useful in determining a geographic area within which the audio, video, and/or RF identifier recording device generating the audio and/or video streams or RF identifiers at step 304 can detect and process audio and/or video or RF identifiers to make an out-of-boundary determination. Such parameters may include a sensitivity of a microphone, a measured level of background noise, an RSSI level, a bit error rate, a focal length of an optical imaging element, a size of an imaging sensor included in the audio, video, and/or RF identifier recording device, a geographic location of the audio, video, and/or RF identifier recording device, an altitude of the audio, video, and/or RF identifier recording device, an orientation of the audio, video, and/or RF identifier recording device, distance or depth information determined via a laser or depth imager attached to the audio, video, and/or RF identifier recording device, and (for pan, tilt, zoom cameras (PTZ)), current pan, tilt, and zoom parameters (and potentially available PTZ capabilities as well). The field-of-view parameters could then be used alone, or in combination with the location information, to determine whether audio, video, and/or RF identifiers received at step 304 include a criminal organization associate outside of an associated criminal organization geofence.

In some embodiments, the electronic computing device may already be paired with the one or more audio, video, and/or RF identifier recording devices providing the one or more audio and/or video streams or RF identities at step 304 via Bluetooth, WiFi, LTE, or other type wireless personal area network (PAN), local area network (LAN), or wide area network (WAN). In other embodiments, the electronic computing device may periodically or on-demand discover the availability of such one or more audio, video, and/or RF identifier recording devices via a local direct-mode wireless broadcast of a discovery packet (which may include a request for location and/or field-of-view information as well) and subsequent receipt of a response from nearby available one or more audio, video, and/or RF identifier recording devices indicating their availability and location or field-of-view (and which in some embodiments may include additional camera imaging parameters such as signal strength of the discovery packet, pan/tilt/zoom capability, resolution, frame rate, power source, etc.). In some embodiments, the electronic computing device may provide first geofence definition information to the one or more audio, video, and/or RF identifier recording devices so that only audio, video, and/or RF identifier recording devices existing within a threshold distance outside of a boundary of the first geofence definition respond and provide the one or more audio and/or video streams or RF identities. The threshold distance may be set by the electronic computing device or stored at the target one or more audio, video, and/or RF identifier recording devices and may be, for example, 50 m, 100 m, 500 m, or 1000 m.

In further embodiments, the electronic computing device may discover the availability of such one or more audio, video, and/or RF identifier recording devices via a request transmitted to an infrastructure network such as infrastructure RAN 152 of FIG. 1, after which the infrastructure network may process the request by similarly polling available one or more audio, video, and/or RF identifier recording devices in a (perhaps threshold) vicinity of the first geofence definition for their ability to provide one or more video streams to the electronic computing device and providing the results to the electronic computing device.

The one or more audio, video, and/or RF identifier recording devices may already be active and recording and may simply provide to the electronic computing device a copy or a link to a location at which a copy of the audio and/or video stream or RF identities being produced can be accessed, or may not currently be active or recording but be capable of transitioning to an active state and subsequently provide the copy or the link to the location at which a copy of the audio and/or video stream or RF identities being produced can be accessed by the electronic computing device.

At step 306, the electronic computing device processes the received one or more audio and/or video streams or RF identities and electronically determines whether an out-of-boundary condition is detected via the one or more audio and/or video streams or RF identities. The out-of-boundary condition being monitored for at step 306 is a condition in which a criminal organization associate is detected outside of a criminal organization geofence of a criminal organization with which the criminal organization associate is a member or associated with.

Electronically determining whether an individual detected in one of the one or more audio and/or video streams or RF identities is associated with a particular criminal organization (in this case, the first criminal organization) may be performed in a number of different ways using the audio and/or video streams or RF identities received at step 304. Several methods of making such a determination are first discussed with respect to the one or more audio and/or video streams or RF identities including a video stream (e.g., one or more captured images over time), are subsequently discussed with respect to the one or more audio and/or video streams or RF identities including an audio stream (e.g., one or more captured samples of audio over time), and are finally discussed with respect to the one or more audio and/or video streams or RF identifiers including RF identifiers. In some embodiments, both types of streams may be used to raise a confidence of an electronic out-of-boundary determination.

For example, and assuming the one or more audio and/or video streams or RF identities include a video stream, the electronic computing device may have access to a database of stored hand gesture(s) associated with the first criminal organization, and may electronically detect, via an image processing algorithm performed on the video stream of the one or more audio and/or video streams or RF identities, a particular hand gesture associated with the first criminal organization performed by an individual (not yet known to be a criminal organization associate or with which criminal organization he or she may be associated) captured in the video stream by a camera located outside of, or having a field-of-view outside of, the first criminal organization geofence. Such varying hand gestures may include differences in number or position selection of extended or non-extended fingers, differences in positioning of the arm relative to the body, differences in amount of arch in the extended fingers, whether the gesture is single or dual-handed, differences in an angle of bend in the wrist, differences in particular overlapping ones of the one or more fingers, or other factors that are capable of being captured and detected via image processing. Each particular hand gesture may be stored as an image and matched with an image of an individual's hand in the video stream, or may be stored as alphanumeric parameter descriptions using parameter descriptions such as those noted just above (e.g., describing the number and/or position of extended or non-extended fingers, etc.), where the image processing algorithm would extract parameter descriptions from the captured image and match them against stored parameter descriptions. Other possibilities exist as well.

Various image processing algorithms may be used to match gestures in the video stream received at step 304 to a detectable (pre-stored) hand gesture, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, or image segmentation and blob analysis. Other possibilities exist as well.

Additionally or alternatively, the electronic computing device may have access to a database of stored clothing characteristics associated with the first criminal organization, and may electronically detect, via an image processing algorithm performed on a video stream of the one or more audio and/or video streams or RF identities, a particular clothing characteristic associated with the first criminal organization worn by an individual captured in the video stream by a camera located outside of, or having a field-of-view outside of, the first criminal organization geofence.

Such varying clothing characteristics may include particular emphasized colors associated with the first criminal organization (e.g., two or more elements of clothing being substantially a single color associated with the first criminal organization), combinations of colors of clothing associated with the first criminal organization (e.g., two or more elements of clothing each being substantially colored one of a plurality of combinatorial color selections matching the first criminal organization), a stitched logo or text on the clothing associated with the first criminal organization, a particular direction in which a bill of a hat is faced associated with the first criminal organization, or some combination of the foregoing or including some other clothing characteristic pre-stored at the electronic computing device and associated with the first criminal organization. Each particular clothing characteristic or combination of clothing characteristics may be stored as an image and matched with an image of an individual's clothing in the video stream, or may be stored as parameter descriptions in a similar manner to that noted above, wherein the image processing algorithm would extract parameter descriptions from the captured image and match against the stored parameter descriptions. Other possibilities exist as well. Various image processing algorithms may be used to match clothing characteristics in the video stream received at step 304 to a detectable (pre-stored) clothing characteristic, including but not limited to those already set forth earlier with respect to hand gestures.

Additionally or alternatively, the electronic computing device may have access to a database of stored body modifications associated with the first criminal organization, and may electronically detect, via an image processing algorithm performed on a video stream of the one or more audio and/or video streams or RF identities, a particular body modification associated with the first criminal organization exhibited by an individual captured in the video stream by a camera located outside of, or having a field-of-view outside of, the first criminal organization geofence.

Such varying body modifications may include particular tattoos having designs and/or located in particular areas of the body associated with the first criminal organization, particular body piercings having designs and/or located in particular areas of the body associated with the first criminal organization, particular body implants having designs and/or located in particular areas of the body associated with the first criminal organization, or some combination of the foregoing or including some other body modification pre-stored at the electronic computing device and associated with the first criminal organization. Each particular body modification or combination of body modifications may be stored as an image and matched with an image of an individual's body modifications in the video stream, or may be stored as parameter descriptions in a similar manner to that noted above, wherein the image processing algorithm would extract parameter descriptions from the captured image and match against the stored parameter descriptions. Other possibilities exist as well. Various image processing algorithms may be used to match body modifications in the video stream received at step 304 to a detectable (pre-stored) body modifications, including but not limited to those already set forth earlier with respect to hand gestures.

Additionally or alternatively, the electronic computing device may have access to a database of stored facial images associated with known associates of the first criminal organization, and may detect, via a facial recognition image processing algorithm performed on an individual from the video stream of the one or more audio and/or video streams or RF identities, a particular face of an individual captured in the video stream by a camera located outside of, or having a field-of-view outside of, the first criminal organization geofence matching one of the stored facial images with a minimum level of confidence, such as 65%, 75%, or 85%.

Various facial recognition image processing algorithms may be used to match stored faces associated with known criminal organization associates, including but not limited to a high dimensional local binary pattern (LBP) algorithm, a Fisher vector algorithm, a Joint Bayesian algorithm, and an associated predict algorithm. Other types of facial recognition image processing algorithms could be used as well.

Additionally or alternatively, the electronic computing device may have access to a database of stored license plates associated with vehicles owned, driven, or otherwise used by associates of the first criminal organization, and may detect, via a license plate recognition image processing algorithm performed on a vehicle from the video stream of the one or more audio and/or video streams or RF identities, a particular license plate of an individual captured in the video stream by a camera located outside of, or having a field-of-view outside of, the first criminal organization geofence matching one of the stored license plates with a minimum level of confidence, such as 65%, 75%, or 85%.

Various license plate recognition image processing algorithms may be used to match stored faces associated with known criminal organization associates, including but not limited to a Hough Transform, a Gabor Transform, or an Adaptive Boosting algorithm. Other types of license plate recognition image processing algorithms could be used as well.

Still further, and assuming the one or more audio and/or video streams or RF identities include an audio stream, the electronic computing device may have access to a database of known speech terms associated with a particular criminal organization. Such speech terms may identify a known primary name or secondary nicknames of the first criminal organization, a particular proper name or nickname of an associate of the first criminal organization, textual descriptions of one of the foregoing video stream parameters (e.g., audio describing a hand gesture, articles of clothing, body modifications, or other visual elements associated with the first criminal organization), or some combination of the foregoing.

In some embodiments, stored digital audio recitations of the predetermined speech terms may be matched against audio received in the audio stream at step 304, while in other embodiments, the audio received in the audio stream at step 304 may be text-converted via a voice-to-text algorithm and matched against text-based versions of the known speech terms. Additionally or alternatively, detected voice footprints can be identified from the audio received in the audio stream at step 304 and compared to known, stored voiceprints associated with known criminal organization associates with a minimum level of confidence, such as 65%, 75%, or 85%. Other methods of finding matches are possible as well. In the case of comparing audio directly or identifying a speaker, various electronic audio comparison algorithms may be used, such a frequency estimation algorithm, hidden Markov model algorithm, Gaussian mixture model algorithm, pattern matching algorithm, neural network algorithm, matrix representation algorithm, or vector quantization algorithm, among other possibilities.

Still further, and assuming the one or more audio and/or video streams or RF identities include one or more RF identities of transmitting wireless computing devices, the electronic computing device may have access to a database of stored RF identifiers of mobile computing devices that are themselves associated with known associates of the first criminal organization, and may detect, via the monitored over-the-air RF identifiers, a particular mobile computing device associated with the known associate of the first criminal organization.

As one example of the foregoing, and as set forth in plan view geographic regions 402 and 502 of systems 400 and 500 in FIGS. 4 and 5, the electronic computing device may receive audio and/or video from one or more of the audio, video, and/or RF identifier recording devices 105, 108, 112, 113, 122, 124, 128, 129 illustrated in FIGS. 4 and 5 and while located outside of or having a field-of-view outside of the third criminal organization geofence 136, and may detect, via one or more of the methods set forth above, one or both of "Yellow" associates 137, 138 (initially illustrated within third criminal organization geofence 136 in FIG. 4) moving outside of their associated third criminal organization geofence 136 (subsequently illustrated in FIG. 5) and responsively cause an out-of-boundary condition to be triggered.

Other methods of using image and/or audio processing or using RF identities to detect an individual with a determined association with a particular criminal organization to be detected to be located outside of an associated criminal organization geofence associated with a particular criminal organization could be used as well.

Returning to FIG. 3, additionally and optionally at step 306, the electronic computing device may also identify whether any of the one or more audio, video, and/or RF identifier recording devices providing the one or more audio and/or video streams or RF identities at step 304 are located within, or have a field-of-view within, a second criminal organization geofence defining a geographic area associated with a second criminal organization having a known adversarial relationship with the first criminal organization.

In a similar embodiment, once the out-of-boundary condition is detected at step 306, the electronic computing device may retrieve one or more second audio and/or video streams or RF identities from one or more second audio, video, and/or RF identifier recording devices (different from the first audio, video, and/or RF identifier recording devices of step 304) located inside of the second criminal organization geofence or having a field-of-view inside of the second criminal organization geofence and begin to process the one or more second audio and/or video streams or RF identities relative to the individual triggering the out-of-boundary condition in step 306. Similar detection mechanisms for detecting the out-of-boundary condition as already noted above could be used in processing the second audio and/or video streams or RF identities and detecting an in-adversary-boundary condition, or, in other embodiments, image captures of the individual or an RF identifier of a mobile computing device associated with the individual detected to be out-of-boundary in step 306 may be used to track the same individual via one or more second audio, video, and/or RF identifier recording devices different from the first audio, video, and/or RF identifier recording devices and determine if the individual detected to be out-of-boundary in step 306 is subsequently detected within a second criminal organization geofence of an adversarial criminal organization.

Known adversarial relationships between criminal organizations may be entered at the electronic computing device (or some other device communicably coupled to the electronic computing device) by a user and stored in a same data structure as the criminal organization geofence, or may be stored in a separate mapping at the electronic computing device or made accessible to the electronic computing device that directly maps a primary criminal organization identifier with one or more secondary criminal organization identifiers with which the primary criminal organization is known to have an adversarial relationship.

As one example of the foregoing, and as set forth in plan view geographic regions 402 and 502 of FIGS. 4 and 5, the electronic computing device may receive video and/or audio from one or more of the audio, video, and/or RF identifier recording devices 105, 108, 112, 113, 122, 124, 128, 129 illustrated in FIGS. 4 and 5 and while located outside of or having a field-of-view outside of the first criminal organization geofence 130, and also located inside of or having a field-of-view inside of the second criminal organization geofence 133, may identify via one or more of the methods set forth above a "Blue" associate 132 that has moved from an initial location in FIG. 4 to a subsequent location in FIG. 5 that is outside of his or her associated criminal organization geofence 130 and also inside of another criminal organization geofence 133 with which the "Blue" criminal organization is known to have an adversarial relationship (again, perhaps determined via geofence definition information associated with each geofence definition or via a separate electronic data mapping) and responsively cause an out-of-boundary condition to be triggered and a separate in-adversary-boundary condition to be triggered as well.

In some further embodiments, detecting the out-of-boundary condition may require not only the identification of an individual associated with a criminal organization being detected, via the one or more audio and/or video streams or RF identities received at step 304, outside of a geofence definition associated with the criminal organization, but also one or more additional context parameters detected that may be selected from detecting the same individual (or same RF identifier) a minimum threshold number of times as out-of-boundary (e.g., tracking the individual via facial recognition or clothing characteristics over a maximum threshold period of time such as 2, 4, or 6 days), detecting the same individual in a location associated with a threshold level of recent criminal activity (e.g., determined via accessing a local or remote criminal history database associated with a location of the audio, video, and/or RF identifier recording device providing the audio and/or video stream or RF identifier), detecting the individual in a location associated with a particular type of recent or currently-occurring criminal activity (e.g., accessed in a same manner of the foregoing and including types of criminal activity such as drug activity, damage to property, theft, assault, etc.), detecting a minimum number of other individuals also associated with the first criminal organization currently in an out-of-boundary state (e.g., tracking the individual and the other individuals via any method already set forth above over a maximum threshold period of time such as 2, 4, or 6 days), detecting the out-of-boundary condition during a particular time of day, detecting the out-of-boundary condition by an individual having a particular stored past criminal history (e.g., if a facial recognition hit is available and using a criminal history retrieved from a local or remote criminal history database), and detecting the out-of-boundary condition by an individual at a location approaching or near a jurisdictional boundary (e.g., determined via comparing a location of the audio, video, and/or RF identifier recording device providing the audio and/or video stream or RF identities relative to a local or remote geographic database of jurisdictional boundaries). Other additional context parameters could be applied as well.

If no out-of-boundary condition is detected at step 306 (or there is but the additional context parameters selected are not detected as noted above), method 300 at the electronic computing device proceeds back to step 304 where the process may repeat using further audio and/or video stream(s) or RF identities received from a same or different one or more audio, video, and/or RF identifier recording devices.

If, however, an out-of-boundary condition is detected at step 306 (with or without an in-adversary-boundary condition and, in some embodiments, with the additional context parameters noted above), processing proceeds to step 308, where the electronic computing device causes a notification of the detected out-of-boundary condition to be one or both of output at the electronic computing device and transmitted to another computing device notifying the another computing device of the out-of-boundary condition.

The electronic notification at step 308 includes at least an identification that an out-of-boundary condition was detected and identifies the criminal organization with which the out-of-boundary condition was detected. In other embodiments, the electronic notification may be populated with additional information, such as a time at which the out-of-boundary condition occurred or was detected, the information relied upon from the one or more audio and/or video streams or RF identities by the electronic computing device to determine that the individual was associated with the first criminal organization, the information relied upon being one of a detected hand gesture, a detected clothing characteristic, a detected body modification, an audio capture of predetermined speech terms, an RF identifier (or mobile computing device or user/associate associated therewith), and a facial-recognition engine result. Additional information may further include an identity of the audio, video, and/or RF identifier recording device that provided the audio and/or video in which the out-of-boundary condition was detected, a location (perhaps including orientation information) of the audio, video, and/or RF identifier recording device that provided the audio and/or video or RF identifier in which the out-of-boundary condition was detected, an identification of the geofence definition boundaries associated with the first criminal organization, and a copy of the one or more audio and/or video streams or RF identities in which the out-of-boundary condition was detected or a link to retrieve and display the one or more audio and/or video streams or RF identities in which the out-of-boundary condition was detected.

The another computing device at step 308 may be any one or more of the mobile computing device 104 associated with the first officer 102 or a mobile computing device associated with some other officer, the RSM 106 associated with the first officer 102 or a mobile computing device associated with some other officer, the additional vehicular computing device at the motor vehicle 110 or a vehicular computing device at some other motor vehicle, the dispatch console 158 or some other infrastructure computing device, or some other target computing device.

Outputting the notification at the electronic computing device and/or the target computing device(s) may include the respective computing device generating and displaying, via a display device coupled to the respective computing device, a notification window with alphanumerical notification text or graphic art in an electronic user interface of the computing device alerting a user thereof (perhaps a patrol officer or a dispatcher) to the electronically detected out-of-boundary condition. The displayed notification window may further include textual and/or graphical descriptions of the additional information noted above. For example, the displayed notification may graphically display the criminal organization geofence associated with the first criminal organization and a location (perhaps including orientation information) associated with the audio, video, and/or RF identifier recording device that provided the audio and/or video stream or RF identities via which the out-of-boundary condition was detected, allowing the user to easily and quickly view a visual depiction of the event. In some embodiments, the visual depiction may be overlaid on underlying cartographic maps, allowing the user to determine himself or herself, or allowing the computing device to determine, a quickest route to the criminal organization geofence associated with the first criminal organization or a quickest route to the location associated with the audio, video, and/or RF identifier recording device that provided the audio and/or video stream or RF identities via which the out-of-boundary condition was detected.

Outputting the notification at the electronic computing device and/or the target computing device(s) may additionally or alternatively include providing an audio or haptic output relative to the electronic notification, such as providing a text-to-speech output of some or all of the notification contents, providing a vibration alert that may vary based on a priority or severity of the out-of-boundary condition, or some other output relative to the electronic notification contents.

In response to outputting the notification at the computing device, a user thereof can gain additional information regarding criminal organization activity, relocate himself or herself or dispatch another officer to the general vicinity of the first criminal organization geofence associated with the first criminal organization, or relocate himself or herself or dispatch another officer to the location associated with the audio, video, and/or RF identifier recording device that provided the audio and/or video stream or RF identities via which the out-of-boundary condition was detected.

In another example, the displayed notification may include a video or image stream window that renders a local copy or remote stream of the audio and/or video stream or RF identities via which the out-of-boundary condition was detected. In some embodiments, and in the case of a video stream, the video stream may be modified by the electronic computing device or target computing device to highlight or outline the individual in the audio and/or video stream or RF identities via which the out-of-boundary condition was detected. In addition, an alert tone and/or flashing visual light may be caused to be played back at the computing device to further indicate that an out-of-boundary condition has been detected.

In a still further embodiment, and still at step 308, the electronic computing device may tag an audio and/or video stream (of the audio and/or video streams or RF identifiers received at step 304) at the time at which the out-of-boundary condition was detected with an indication that the out-of-boundary condition was electronically detected. The modified audio and/or video stream can then be stored locally and/or provided to a remote storage area for future processing, including analytics review of criminal organization movements and behavior or for use in subsequent investigations of later-reported crimes. In the event that a facial recognition hit on the out-of-boundary criminal organization associate generated the out-of-boundary condition, the video stream may further be tagged with an identity of the corresponding criminal organization associate generated from the facial recognition algorithm. RF identifiers could be similarly tagged with information identifier a time at which the out-of-boundary condition was detected before being stored.

In some embodiments, the prominence of the displayed notification and/or video stream window may be caused to vary based on the determined identity of the criminal organization associate that generated the out-of-boundary condition or the criminal organization with which the individual was determined to be associated. For example, in the event that a facial recognition hit identified the particular out-of-boundary criminal organization associate that generated the out-of-boundary condition or that an audio sample from the criminal organization associate that generated the out-of-boundary condition is determined to match a voice sample previously stored and associated with the particular out-of-boundary criminal organization associate, the displayed notification may be caused to vary based on the identity. If the identity of the particular out-of-boundary criminal organization associate is high profile (e.g., high ranking in the criminal organization) or otherwise known dangerous individual, the displayed notification may be caused to be displayed at the user interface at the computing device in a more prominent fashion, for example at a larger or largest possible screen size, at a center-most area of the screen, and/or accompanied by an audio tone or flashing visual light. If, on the other hand, the identity of the particular out-of-boundary criminal organization associate is low profile (e.g., low ranking in the criminal organization) or otherwise not known to be a dangerous individual, the displayed notification may be caused to be displayed at the user interface at the computing device in a less prominent fashion, for example at a smaller or smallest possible screen size, at a corner area of the screen, and/or not accompanying any additional audio tone or flashing colors or borders.

After step 308, the method 300 may end, or may return to step 304 along optional path 310, at which time additional audio and/or video stream or RF identifier data provided by the one or more audio, video, and/or RF identifier recording devices (or other, different audio and/or recording devices) may be similarly analyzed for out-of-boundary conditions in a manner as already set forth above.

3. Processes for Operating an Electronic Computing Device to Electronically Monitor and Update Criminal Organization Geofences Turning now to FIG. 6, a flow chart diagram illustrates a method 600 for electronically maintaining one or more criminal organization geofences associated with respective criminal organizations as various patterns of electronically detected conduct of one or more individuals associated with the criminal organizations is or are detected.

While a particular order of processing steps, message receptions, and/or message transmissions is indicated in FIG. 6 for exemplary purposes, timing and ordering of such steps, receptions, and transmissions may vary where appropriate without negating the purpose and advantages of the examples set forth in detail throughout the remainder of this disclosure. An electronic computing device may execute method 600 at power-on, at some predetermined periodic time period, in response to a trigger raised locally at the device via an internal process or via an input interface, or in response to receiving a wirelessly or wiredly transmitted trigger from a remote device such as a mobile computing device, an autonomous unmanned aerial vehicle, a fixed camera, or an infrastructure controller, among other possibilities.

Figure 7:
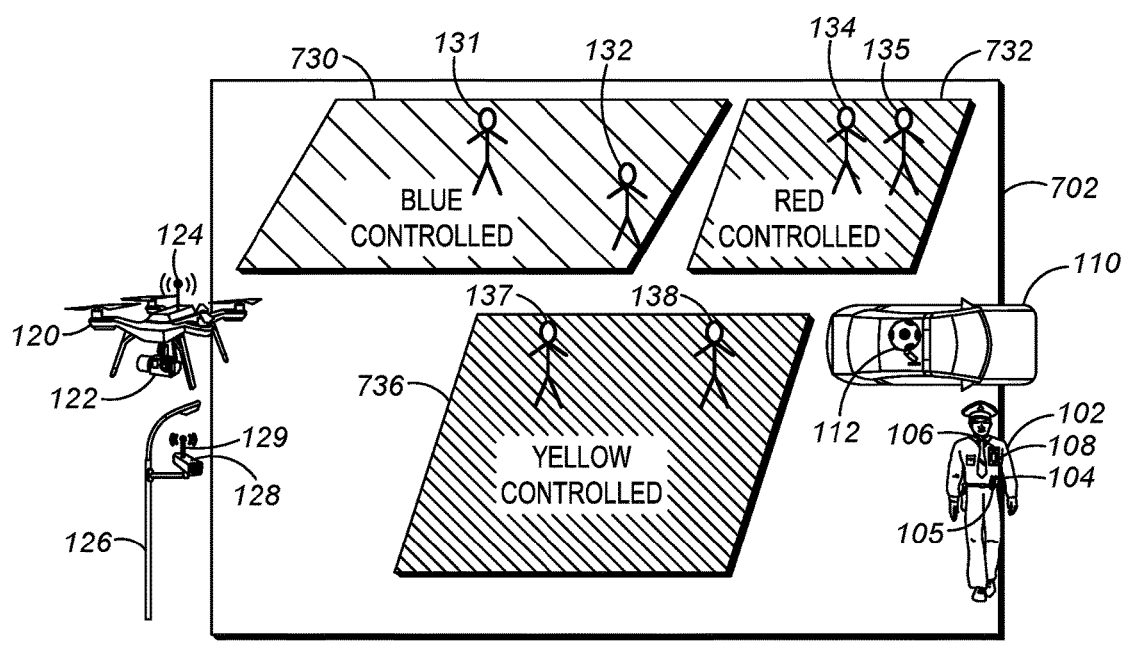
FIG. 7 illustrates a plan view of a further subsequent state of the plurality of criminal organization geofences and associates of criminal organizations, in accordance with some embodiments.

The electronic computing device executing method 600 may include an edge device same or similar to any one or more of the first officer's 102 mobile computing device 104 of FIG. 1, the first officer's RSM 106, the motor vehicle's 110 electronic computing device, the autonomous unmanned aerial vehicle's 120 electronic computing device, the light post's 126 electronic computing device, or at audio, video, and/or RF identifier recording devices 105, 108, 112, 113, 122, 124, 128, 129 at an infrastructure computing device same or similar to the controller 156 or disposed elsewhere in an infrastructure network, or at a combination of two or more of the foregoing. FIGS. 5 and 7 illustrate plan views of an initial and a subsequent state of a plurality of criminal organization geofences as a pattern of conduct of criminal organization associates is electronically detected and will be referenced relative to particular steps of method 600 for further clarity.

Method 600 of FIG. 6 begins at step 602, where the electronic computing device maintains a stored first geofence definition of a first criminal organization geofence defining a criminal organization geofence associated with a first criminal organization. The electronic computing device at step 602 may perform the same or similar function and operate on same or similar data structures as the electronic computing device described above with respect to step 302 of FIG. 3, and that description is incorporated herein by reference.

At step 604, the electronic computing device receives one or more audio and/or video streams or RF identifiers from one or more audio, video, and/or RF identifier recording devices located outside of or inside of the first criminal organization geofence, or having a field-of-view outside of or inside of the first criminal organization geofence.

The device or devices generating the audio and/or video streams or RF identifiers and providing it to the electronic computing device may be the same or similar devices already described above with respect to the electronic computing device executing step 304 of FIG. 3, with the exception of the location and/or field-of-view noted immediately above, and that description is incorporated herein by reference.

Also at step 604, in some embodiments and separate from any detection of patterns-of-conduct described with respect to step 606, the electronic computing device may identify, via the one or more audio and/or video streams or RF identifiers, a particular individual already associated with the first criminal organization at the electronic computing device and identify, via the one or more audio and/or video streams or RF identifiers, nearby associates of the particular individual. The electronic computing device may then digitally capture images of the faces of the nearby associates or RF identifiers of nearby associates, and store the captured faces or RF identifiers accompanying newly created associations between the captured faces or RF identifiers and the first criminal organization in respective facial recognition or RF identifier databases. As a result, additional opportunities can be created for detecting patterns-of-conduct of individual associated with criminal organizations in subsequent steps.

At step 606, the electronic computing device processes the received one or more audio and/or video streams or RF identifiers and electronically determines whether a pattern-of-conduct of one or more individuals associated with the first criminal organization or with another criminal organization known to have an adversarial relationship with the first criminal organization, indicative of an expansion or contraction of the criminal organization geofence associated with the first criminal organization, is detected via the one or more audio and/or video streams or RF identifiers.

The pattern-of-conduct being monitored for at step 306 is a repeated electronically detected conduct (e.g., a same conduct repeated multiple times by a same person over time, different conduct repeated by a same person over time, or same or different conduct repeated by different persons over time) all associated with the first criminal organization or all associated with another criminal organization known to have an adversarial relationship with the first criminal organization that, due to the repetition, provides an indication that one or more geofence definitions associated with the first criminal organization or with the another criminal organization need to be modified.

The pattern-of-conduct may be, for example, related to a hand gesture and may include a detection by the electronic computing device via a video stream portion of the one or more audio and/or video streams or RF identifiers received at step 604 of two or more individuals displaying a hand gesture matching a stored hand gesture associated with the first criminal organization in an area outside of the first criminal organization geofence which would imply that the boundary of the first criminal organization geofence should be expanded to incorporate an area outside of the first criminal organization geofence in which the pattern of conduct is detected. The types of hand gestures and methods of electronically detecting the hand gestures may be the same or similar to that set forth above with respect to step 306 of FIG. 3, and that description is incorporated herein by reference.

Additionally or alternatively, this may include the electronic computing device detecting two or more individuals displaying a hand gesture matching a stored hand gesture associated with the another criminal organization in an area inside of the first criminal organization geofence which would imply that the boundary of the first criminal organization geofence should be contracted to remove an area inside of the first criminal organization geofence in which the pattern of conduct is detected.

The pattern-of-conduct may also be, for example, related to clothing characteristics of clothing worn by individuals and may include a detection by the electronic computing device via a video stream portion of the one or more audio and/or video streams or RF identifiers received at step 604 of two or more individuals displaying a clothing characteristic matching a stored clothing characteristic associated with the first criminal organization in an area outside of the first criminal organization geofence which would imply that the boundary of the first criminal organization geofence should be expanded to incorporate an area outside of the first criminal organization geofence in which the pattern of conduct is detected. The types of clothing characteristics and methods of electronically detecting the clothing characteristics may be the same or similar to that set forth above with respect to step 306 of FIG. 3, and that description is incorporated herein by reference.

Additionally or alternatively, this may include the electronic computing device detecting two or more individuals displaying a clothing characteristic matching a stored clothing characteristic associated with the another criminal organization in an area inside of the first criminal organization geofence which would imply that the boundary of the first criminal organization geofence should be contracted to remove an area inside of the first criminal organization geofence in which the pattern of conduct is detected.

The pattern-of-conduct may also be, for example, related to a body modification of individuals and may include a detection by the electronic computing device via a video stream portion of the one or more audio and/or video streams or RF identifiers received at step 604 of two or more individuals displaying body modifications matching a stored body modification associated with the first criminal organization in an area outside of the first criminal organization geofence which would imply that the boundary of the first criminal organization geofence should be expanded to incorporate an area outside of the first criminal organization geofence in which the pattern of conduct is detected. The types of body modifications and methods of electronically detecting the body modifications may be the same or similar to that set forth above with respect to step 306 of FIG. 3, and that description is incorporated herein by reference.

Additionally or alternatively, this may include the electronic computing device detecting two or more individuals displaying a body modification matching a stored body modification associated with the another criminal organization in an area inside of the first criminal organization geofence which would imply that the boundary of the first criminal organization geofence should be contracted to remove an area inside of the first criminal organization geofence in which the pattern of conduct is detected.

The pattern-of-conduct may also be, for example, related to a facial recognition match of individuals and may include a detection by the electronic computing device via a video stream portion of the one or more audio and/or video streams or RF identifiers received at step 604 of two or more individuals in an area outside of the first criminal organization geofence having faces that, when captured and provided to a facial recognition image processing algorithm, provides a match with a stored facial image associated with the first criminal organization at a minimum level of confidence, such as 65%, 75%, or 85%, which would imply that the boundary of the first criminal organization geofence should be expanded to incorporate an area outside of the first criminal organization geofence in which the pattern of conduct is detected. The particular facial recognition image processing algorithms may be the same or similar to that set forth above with respect to step 306 of FIG. 3, and that description is incorporated herein by reference.

Additionally or alternatively, this may include the electronic computing device detecting two or more individuals in an area inside of the first criminal organization geofence having faces that, when captured and provided to a facial recognition image processing algorithm, provides a match with a stored facial image associated with the another criminal organization at the minimum level of confidence, which would imply that the boundary of the first criminal organization geofence should be contracted to remove an area inside of the first criminal organization geofence in which the pattern of conduct is detected.

The pattern-of-conduct may also be, for example, related to a license plate recognition match of vehicle license plates and may include a detection by the electronic computing device via a video stream portion of the one or more audio and/or video streams or RF identifiers received at step 604 of two or more vehicles in an area outside of the first criminal organization geofence having license plates that, when captured and provided to a license plate recognition image processing algorithm, provides a match with a stored license plate associated with the first criminal organization at a minimum level of confidence, such as 65%, 75%, or 85%, which would imply that the boundary of the first criminal organization geofence should be expanded to incorporate an area outside of the first criminal organization geofence in which the pattern of conduct is detected. The particular license plate recognition image processing algorithms may be the same or similar to that set forth above with respect to step 306 of FIG. 3, and that description is incorporated herein by reference.

Additionally or alternatively, this may include the electronic computing device detecting two or more vehicles in an area inside of the first criminal organization geofence having license plates that, when captured and provided to a license plate recognition image processing algorithm, provides a match with a stored license plate associated with the another criminal organization at the minimum level of confidence, which would imply that the boundary of the first criminal organization geofence should be contracted to remove an area inside of the first criminal organization geofence in which the pattern of conduct is detected.

The pattern-of-conduct may also be, for example, related to a speech recognition match of individuals and may include a detection by the electronic computing device via an audio stream portion of the one or more audio and/or video streams or RF identifiers received at step 604 of two or more individuals in an area outside of the first criminal organization geofence providing electronically detectable speech audio that, when captured and provided to a speech recognition algorithm, provides a match with stored known speech terms associated with the first criminal organization (or matching a known, stored voiceprint associated with known criminal organization associates with a minimum level of confidence, such as 65%, 75%, or 85%) that would imply that the boundary of the first criminal organization geofence should be expanded to incorporate an area outside of the first criminal organization geofence in which the pattern of conduct is detected. The particular audio processing algorithms and speech terms may be the same or similar to that set forth above with respect to step 306 of FIG. 3, and that description is incorporated herein by reference.

Additionally or alternatively, this may include the electronic computing device detecting two or more individuals in an area inside of the first criminal organization geofence providing electronically detectable speech audio that, when captured and provided to an audio processing algorithm, provides a match with known speech terms associated with the another criminal organization (or or matching a known, stored voiceprint associated with known criminal organization associates with a minimum level of confidence, such as 65%, 75%, or 85%) that would imply that the boundary of the first criminal organization geofence should be contracted to remove the area inside of the first criminal organization geofence in which the pattern of conduct is detected.

The pattern-of-conduct may also be, for example, related to an RF identifier match of individuals and may include a detection by the electronic computing device via an RF identifier portion of the one or more audio and/or video streams or RF identifiers received at step 604 of two or more individuals in an area outside of the first criminal organization geofence carrying mobile computing devices providing electronically detectable RF identifiers that match RF identifiers associated with the first criminal organization that would imply that the boundary of the first criminal organization geofence should be expanded to incorporate an area outside of the first criminal organization geofence in which the pattern of conduct is detected.

Additionally or alternatively, this may include the electronic computing device detecting two or more individuals in an area inside of the first criminal organization geofence carrying mobile computing devices providing electronically detectable RF identifiers that match RF identifiers associated with the another criminal organization that would imply that the boundary of the first criminal organization geofence should be contracted to remove the area inside of the first criminal organization geofence in which the pattern of conduct is detected.

Detecting any of the patterns-of-conduct noted above may include detecting one or more patterns-of-conduct a minimum threshold number of times over a maximum threshold period of time and by a minimum threshold number of individuals associated with the first criminal organization or associated with another criminal organization known to have an adversarial relationship with the first criminal organization. For example, the minimum threshold number of times may be greater than two or greater than five or ten, the maximum threshold period of time may be one day or seven days or thirty days, and the minimum threshold number of individuals may be two, ten, or fifty. In some embodiments, values of the minimum threshold number of times, the maximum threshold period of time, and the minimum threshold number of individuals may vary as a function of an underlying population density of an area in and/or surrounding the first geofence (retrievable by the electronic computing device from a census server), such that higher thresholds are applied for higher population densities and lower thresholds applied for lower population densities.

In some further embodiments, detecting the pattern-of-conduct condition at step 606 may require not only the identification of the pattern-of-conduct of one or more individuals associated with a criminal organization in the manner noted above, but also one or more additional context parameters selected from detecting the same individual a minimum threshold number of times in the same out-of-boundary or in-boundary location (e.g., tracking the individual via RF identifier, facial recognition, or clothing characteristics over a maximum threshold period of time such as 2, 4, or 6 days), detecting the same individual in a location associated with a threshold level of recent criminal activity (e.g., determined via accessing a local or remote criminal history database associated with a location of the audio, video, and/or RF identifier recording device providing the audio and/or video stream or RF identifier), detecting the individual in a location associated with a particular type of recent criminal activity (e.g., accessed in a same manner of the foregoing and including types of criminal activity such as drug activity, damage to property, theft, assault, etc.), detecting the pattern-of-conduct condition during a particular time of day, detecting the pattern-of-conduct condition by one or more individuals having a particular stored past criminal history (e.g., if a facial recognition hit is available and the criminal history retrieved from a local or remote criminal history database), and detecting the pattern-of-conduct condition by the one or more individuals at a location approaching or near a jurisdictional boundary (e.g., determined via comparing a location of the audio, video, and/or RF identifier recording device providing the audio and/or video stream or RF identifier relative to a local or remote geographic database of jurisdictional boundaries).

One further additional context parameter may be whether the pattern-of-conduct not only detects that the one or more individuals associated with the first criminal organization are outside of a first geofence definition with which they are associated, but also whether they are detected inside of a second geofence definition associated with another criminal organization with which the first criminal organization has a known adversarial relationship (e.g., a pattern-of-conduct of the one or more individuals associated with the first criminal organization while also detected in an in-adversary-boundary condition). Repeated detections of patterns-of-conduct under such a situation may give more credence to a determination that a change in geographic boundaries of the geofences should be made, since under normal circumstances, the another criminal organization would not tolerate such trespass.

For example, the electronic computing device may identify whether any of the one or more audio, video, and/or RF identifier recording devices providing the one or more audio and/or video streams or RF identifiers at step 604 are located within, or have a field-of-view within, a second criminal organization geofence associated with a second criminal organization having a known adversarial relationship with the first criminal organization in a similar manner to that already set forth above with respect to method 300.

As a first example of electronic pattern-of-conduct detection, and referring to geographic regions 502 and 702 of FIGS. 5 and 7, the electronic computing device may receive video and/or audio from one or more of the audio, video, and/or RF identifier recording devices 105, 108, 112, 113, 122, 124, 128, 129 illustrated in FIGS. 5 and 7 and while located outside of or having a field-of-view outside of the first criminal organization geofence 130 of FIG. 5 and/or located inside of or having a field-of-view inside of the second criminal organization geofence 133, may identify, via one or more of the methods set forth above, one of the "Blue" associates 132 (and perhaps more "Blue" associates not illustrated in FIG. 5) having a pattern-of-conduct detected within an area of the "Red" associated criminal organization geofence 133 in FIG. 5 sufficient to cause a change in geographic boundaries of the first and second criminal organization geofences 130 and 133 of FIG. 5 into the first and second criminal organization geofences 730 and 732 of FIG. 7.

As a second example of electronic pattern-of-conduct detection, the electronic computing device may receive video and/or audio from one or more of the audio, video, and/or RF identifier recording devices 105, 108, 112, 113, 122, 124, 128, 129 illustrated in FIGS. 5 and 7 and while located outside of or having a field-of-view outside of the third criminal organization geofence 136 and/or located inside of or having a field-of-view inside of the second criminal organization geofence 133 of FIG. 5, may identify, via one or more of the methods set forth above, one of the "Yellow" associates 132 (and perhaps more "Yellow" associates not illustrated in FIG. 5) having a pattern-of-conduct detected within an area above the "Yellow" criminal organization geofence 136 but below the "Red" criminal organization geofence 133 of FIG. 5 sufficient to cause a change in geographic boundaries of the third criminal organization geofence 136 of FIG. 5 into the third criminal organization geofence 736 of FIG. 7.

Other methods of using audio and/or video processing to electronically detect a pattern-of-conduct of one or more individuals associated with the first criminal organization from audio and/or video streams or RF identifiers captured via audio, video, and/or RF identifier recording devices located or having a field-of-view inside or outside of a first criminal organization geofence associated with the first criminal organization could be used as well.

If no pattern-of-conduct condition is detected at step 606 (or the additional context parameters selected are not detected as noted above), method 600 at the electronic computing device proceeds back to step 604 where the process may repeat using further audio and/or video stream(s) or RF identifiers received from a same or different one or more audio, video, and/or RF identifier recording devices.

If, however, a pattern-of-conduct condition is detected at step 606 (with or without an in-adversary-boundary condition and, in some embodiments, with the additional context parameters noted above), processing proceeds to step 608, where the electronic computing device one of expands and contracts a boundary of the first criminal organization geofence associated with the first criminal organization and provides the updated first criminal organization geofence to one or more target devices for output or further electronic processing. Outputting the updated first criminal organization geofence at the one or more target devices may include the respective target computing devices generating and displaying, via a display device coupled to the respective target computing device, a window with alphanumerical text or graphic art that represents the change in the geofence. The display may further include textual and/or graphical descriptions of the additional information noted below. In some embodiments, a visual depiction of the old and new geofences may be overlaid on underlying cartographic maps, allowing the user to determine himself or herself, or allowing the computing device to determine, how the areas associated with each criminal organization have changed due to the electronically detected pattern-of-conduct.

Outputting the notification at the target computing device(s) may additionally or alternatively include providing an audio or haptic output relative to the change in geofence, such as providing a text-to-speech output of some or all of the changes (e.g., announcing neighborhoods or street names associated with the area expanded into or contracted from, and the identity of the criminal organization affected, among other possibilities), providing a vibration alert that may vary in intensity based on a severity of the change in geofence size or based on a priority of the underlying criminal organization or criminal organization associate, or some other output relative to the update.

Multiple updates to multiple geofence definitions (besides the first criminal organization geofence) may also be detected (at step 606), updated, and then provided at step 608 for a same electronic pattern-of-conduct detection. For example, and with respect to the example above regarding the pattern-of-conduct detection relative to the "Blue" associate 132 detected outside of the first criminal organization geofence 130 and within the second criminal organization geofence 133, which caused the first criminal organization geofence 130 of FIG. 5 to expand into the first criminal organization geofence 730 of FIG. 7 and the second criminal organization geofence 133 of FIG. 5 to contract into the second criminal organization geofence 732 of FIG. 7, the updated criminal organization geofences may both be provided to the one or more target devices for output or further electronic processing. The updated geofences may contain only the updated portions of the geographic boundaries, or may contain all of the additional information noted above that may also be included in such geofence definitions. The update may also set a "last modified" date and/or time to a current date and/or time, and may also include an indication of a reason behind the update (e.g., an identification of the particular pattern-of-conduct electronically detected at step 306 leading to the expansion and/or contraction of the respective geofences).

Still further additional information accompanying the updated geofences may include a time or times at which the pattern-of-conduct occurred or was detected, an identity of the one or more audio, video, and/or RF identifier recording devices that provided the audio, video, and/or RF identifiers in which the pattern-of-conduct condition was detected, a location (perhaps including orientation information) of the audio, video, and/or RF identifier recording devices that provided the audio, video, and/or RF identifiers in which the pattern-of-conduct condition was detected, and a copy of the one or more audio and/or video streams or RF identifiers in which the pattern-of-conduct boundary condition was detected or a link to retrieve and display the one or more audio and/or video streams or RF identifiers in which the pattern-of-conduct condition was detected. Such additional information may be similarly output (via display, audio, or haptic output) at the one or more target devices.

The one or more target devices may be any one or more computing devices that make electronic use of the geofences, including for example, the mobile computing device 104 associated with the first officer 102 or a mobile computing device associated with some other officer, the RSM 106 associated with the first officer 102 or a mobile computing device associated with some other officer, the additional vehicular computing device at the motor vehicle 110 or a vehicular computing device at some other motor vehicle, the dispatch console 158 or some other infrastructure computing device, or some other target electronic computing device.

The electronic computing device may provide, and the one or more target devices may additionally output (as received from the electronic computing device or retrieved from storage), the pre-modified geofence in addition to the modified geofence. The target devices may additionally modify the displayed geofences in some manner to more clearly show the newly added or newly contracted area in a different way (e.g., a different color, shade, hatch, etc.).

In response to outputting the geofence change at the target device, a user thereof can gain additional information regarding criminal organization activity and geographic areas under control, and may modify a patrolling schedule or route or request another officer modify a patrolling schedule or route in light of the geofence changes.

In a still further embodiment, and still at step 308, the electronic computing device may tag the audio and/or video stream at the time at which the pattern-of-conduct condition was detected with an indication that the pattern-of-conduct condition was detected. The modified audio and/or video stream can then be stored locally and/or provided to a remote storage area for future processing including analytics review of criminal organization geofences or for use in subsequent investigations of later-reported crimes. In the event that a facial recognition result is provided for the individual(s) detected to be exhibiting the detected pattern-of-conduct, the video stream may further be tagged with an identity of the corresponding individual(s) generated from the facial recognition algorithm. RF identifiers could be similarly tagged with information identifier a time at which the out-of-boundary condition was detected before being stored.

In some embodiments, the prominence of the displayed change in geofence definition may be caused to vary based on the determined identity of the criminal organizations that either grew or shrank (e.g., a criminal organization identified as high importance may be more prominently displayed than those marked as lower priority), and perhaps based on an amount of change to the geofence definition (e.g., an increase or decrease in geofence definition size of greater than 40 or 60 percent may be more prominently displayed than a change of less than 40 or 20 percent). If the identity of the criminal association is high priority or the change in size is large, the displayed changed geofence may be caused to be displayed at the user interface at the electronic computing device in a more prominent fashion, for example at a larger or largest possible screen size, at a center-most area of the screen, and/or accompanied by an audio tone or flashing visual light. If, on the other hand, criminal association is low priority or the change in size is small, the displayed changed geofence may be caused to be displayed at the user interface at the computing device in a less prominent fashion, for example at a smaller or smallest possible screen size, at a corner area of the screen, and/or not accompanying any additional audio tone or flashing colors or borders.

After step 608, the method 600 may end, or may return to step 604 along optional path 610, at which time additional audio and/or video stream data provided by the one or more audio, video, and/or RF identifier recording devices (or other, different audio and/or recording devices) may be similarly analyzed for pattern-of-conduct conditions as already set forth above.

3. Conclusion

In accordance with the foregoing, an improved method, device, and system for electronically monitoring, maintaining, and adjusting electronic geofence definitions associated with criminal organizations and providing such updated electronic geofence definitions to target electronic devices for further use and processing is disclosed, and an improved method, device, and system for detecting an out-of-boundary condition for a criminal organization and proactively and responsively notifying users and/or other electronic devices when such an out-of-boundary condition is detected is disclosed. As a result of the foregoing, geographic areas of control associated with criminal organizations can be more efficiently and effectively electronically monitored, and automatic notifications provided to the relevant responders when criminal organization out-of-boundary conditions are electronically detected relative to such geographic areas of control, allowing for automatic dispatch of supporting personnel in those situations where processing of audio and/or video justify a level of response to ensure the safety of people and property.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of electronically detecting a criminal organization out-of-boundary condition, the method comprising:
maintaining, at an electronic computing device, a stored first geofence definition defining a geographic area associated with a first criminal organization;
receiving, at the electronic computing device, one or more audio and/or video streams or RF identifiers from one or more audio, video, and/or RF identifier recording devices located outside of the first geofence definition or having a field-of-view outside of the first geofence definition;
detecting, at the electronic computing device via the one or more audio and/or video streams or RF identifiers, an out-of-boundary condition in which an individual determined to be associated with the first criminal organization is detected outside of the first geofence definition;
responsive to detecting the out-of-boundary condition, causing, by the electronic computing device, an electronic notification of the out-of-boundary condition to be one of output at the electronic computing device and transmitted, by the electronic computing device, to another computing device notifying the another computing device of the out-of-boundary condition; and
maintaining, at the electronic computing device, a second geofence definition defining a geographic area associated with a second criminal organization having a known adversarial relationship with the first criminal organization and, responsive to detecting the out-of-boundary condition, retrieving one or more second audio and/or video streams or RF identifiers from one or more second audio, video, and/or RF identifier recording devices located inside of the second geofence definition or having a field-of-view inside of the second geofence definition and beginning to process the one or more second audio and/or video streams or RF identifiers relative to the individual.

2. A method of electronically detecting a criminal organization out-of-boundary condition, the method comprising:
maintaining, at an electronic computing device, a stored first geofence definition defining a geographic area associated with a first criminal organization;
receiving, at the electronic computing device, one or more audio and/or video streams or RF identifiers from one or more audio, video, and/or RF identifier recording devices located outside of the first geofence definition or having a field-of-view outside of the first geofence definition;
detecting, at the electronic computing device via the one or more audio and/or video streams or RF identifiers, an out-of-boundary condition in which an individual determined to be associated with the first criminal organization is detected outside of the first geofence definition;
responsive to detecting the out-of-boundary condition, causing, by the electronic computing device, an electronic notification of the out-of-boundary condition to be one of output at the electronic computing device and transmitted, by the electronic computing device, to another computing device notifying the another computing device of the out-of-boundary condition; and
maintaining, at the electronic computing device, a second geofence definition defining a geographic area associated with a second criminal organization having a known adversarial relationship with the first criminal organization;
wherein detecting the out-of-boundary condition further comprises detecting that the individual determined to be associated with the first criminal organization is both detected outside of the first geofence definition and detected within the second geofence definition.

3. The method of claim 2, wherein detecting that the individual determined to be associated with the first criminal organization is detected within the second geofence definition comprises:
receiving, at the electronic computing device, one or more second audio and/or video streams or RF identifiers from one or more second audio, video, and/or RF identifier recording devices located inside of the second geofence definition or having a field-of-view inside of the second geofence definition; and
detecting, at the electronic computing device via the one or more second audio and/or video streams or RF identifiers, an in-boundary condition in which the individual determined to be associated with the first criminal organization is detected inside of the second geofence definition.

4. The method of claim 3, wherein the one or more first audio, video, and/or RF identifier recording devices are the same as the one or more second audio, video, and/or RF identifier recording devices and the one or more first audio and/or video streams or RF identifiers are the same as the one or more second audio and/or video streams or RF identifiers.

5. A method of electronically detecting a criminal organization out-of-boundary condition, the method comprising:
maintaining, at an electronic computing device, a stored first geofence definition defining a geographic area associated with a first criminal organization;
receiving, at the electronic computing device, one or more audio and/or video streams or RF identifiers from one or more audio, video, and/or RF identifier recording devices located outside of the first geofence definition or having a field-of-view outside of the first geofence definition;
detecting, at the electronic computing device via the one or more audio and/or video streams or RF identifiers, an out-of-boundary condition in which an individual determined to be associated with the first criminal organization is detected outside of the first geofence definition; and
responsive to detecting the out-of-boundary condition, causing, by the electronic computing device, an electronic notification of the out-of-boundary condition to be one of output at the electronic computing device and transmitted, by the electronic computing device, to another computing device notifying the another computing device of the out-of-boundary condition;
wherein causing, by the electronic computing device, the electronic notification of the out-of-boundary condition to be one of output at the electronic computing device and transmitted, by the electronic computing device, to another computing device notifying the another computing device of the out-of-boundary condition is executed responsive to both (i) detecting the out-of-boundary condition and (ii) an additional context parameter selected from detecting the individual a minimum threshold number of times as out-of-boundary, detecting the individual in a location associated with a threshold level of recent criminal activity, detecting the individual in a location associated with a particular type of recent criminal activity, detecting a minimum number of other individuals also associated with the first criminal organization currently in an out-of-boundary state, detecting the out-of-boundary condition during a particular time of day, detecting the out-of-boundary condition by the individual having a particular stored past criminal history, and detecting the out-of-boundary condition by the individual at a location approaching or near a jurisdictional boundary.

6. The method of claim 5, wherein the electronic notification includes information relied upon from the one or more audio and/or video streams or RF identifiers by the electronic computing device to determine that the individual was associated with the first criminal organization, the information relied upon being one of a detected hand gesture, a detected clothing characteristic, a detected body modification, an audio recording of predetermined speech terms, a facial recognition engine result, and an RF identifier comparison result.

7. The method of claim 5, wherein detecting the out-of-boundary condition comprises detecting, in a video portion of the one or more audio and/or video streams or RF identifiers, the individual displaying a hand gesture matching a stored hand gesture associated with the first criminal organization.

8. The method of claim 5, wherein detecting the out-of-boundary condition comprises detecting, in a video stream portion of the one or more audio and/or video streams or RF identifiers, the individual wearing clothing have a clothing characteristic matching a stored clothing characteristic.

9. The method of claim 8, wherein the stored clothing characteristic is a combination of a plurality of solid colors matching a stored combination of a plurality of solid colors associated with the first criminal organization.

10. The method of claim 9, wherein detecting the out-of-boundary condition comprises detecting, in a video stream portion of the one or more audio and/or video streams or RF identifiers, the individual displaying a body modification characteristic matching a stored body modification characteristic associated with the first criminal organization.

11. The method of claim 9, wherein detecting the out-of-boundary condition comprises detecting, in a video stream portion of the one or more audio and/or video streams or RF identifiers, the individual's face matching a stored face associated with the first criminal organization at a minimum threshold confidence.

12. The method of claim 5, further comprising receiving an update that either expands or contracts the geographic area associated with the first criminal organization, and updating, by the electronic computing device, the first geofence definition accordingly.

13. The method of claim 5, wherein the electronic computing device is an infrastructure server computing device, and the one or more first audio, video, and/or RF identifier recording devices are fixed cameras communicably coupled to the infrastructure server.

14. The method of claim 5, wherein the electronic computing device is a mobile computing device and the one or more audio, video, and/or RF identifier recording devices are mobile cameras physically coupled to one of a motor vehicle and a mobile user individual.

15. The method of claim 5, further comprising responsive to detecting the out-of-boundary condition, tagging the one or more audio and/or video streams or RF identifiers at a time at which the out-of-boundary condition was detected in the one or more audio and/or video streams to indicate the out-of-boundary condition prior to storing the one or more audio and/or video streams or RF identifiers for future reference and retrieval.

16. The method of claim 5, wherein causing, by the electronic computing device, the electronic notification of the out-of-boundary condition to be one of output at the electronic computing device and transmitted, by the electronic computing device, to another computing device notifying the another computing device of the out-of-boundary condition comprises causing an electronic notification to be transmitted to a dispatch console at a command and control center.

17. The method of claim 5, wherein the electronic notification includes the one or more audio and/or video streams or RF identifiers or a link to retrieve and display the one or more audio and/or video streams or RF identifiers.

18. The method of claim 5, wherein the electronic notification includes a location of the one or more audio, video, and/or RF identifier recording devices that provided the one or more audio and/or video streams or RF identifiers.

19. A computing device for electronically detecting a criminal organization out-of-boundary condition, the computing device comprising:
one or more non-transitory, computer-readable memories;
one or more transceivers; and
one or more processors that, in response to executing instructions stored in the one or more non-transitory, computer-readable memories, perform a set of functions comprising:
maintain a stored first geofence definition defining a geographic area associated with a first criminal organization;
receive, via the one or more transceivers, one or more audio and/or video streams or RF identifiers from one or more audio, video, and/or RF identifier recording devices located outside of the first geofence definition or having a field-of-view outside of the first geofence definition;
detect, via the one or more audio and/or video streams or RF identifiers, an out-of-boundary condition in which an individual determined to be associated with the first criminal organization is detected outside of the first geofence definition; and
responsive to detecting the out-of-boundary condition, cause an electronic notification of the out-of-boundary condition to be one of output at the electronic computing device and transmitted, via the one or more transceivers, to another computing device notifying the another computing device of the out-of-boundary condition;
wherein causing the electronic notification of the out-of-boundary condition to be one of output at the electronic computing device and transmitted, via the one or more transceivers, to another computing device notifying the another computing device of the out-of-boundary condition is executed responsive to both (i) detecting the out-of-boundary condition and (ii) an additional context parameter selected from detecting the individual a minimum threshold number of times as out-of-boundary, detecting the individual in a location associated with a threshold level of recent criminal activity, detecting the individual in a location associated with a particular type of recent criminal activity, detecting a minimum number of other individuals also associated with the first criminal organization currently in an out-of-boundary state, detecting the out-of-boundary condition during a particular time of day, detecting the out-of-boundary condition by the individual having a particular stored past criminal history, and detecting the out-of-boundary condition by the individual at a location approaching or near a jurisdictional boundary.

20. A computing device for electronically detecting a criminal organization out-of-boundary condition, the computing device comprising:
 one or more non-transitory, computer-readable memories;
 one or more transceivers; and
 one or more processors that, in response to executing instructions stored in the one or more non-transitory, computer-readable memories, perform a set of functions comprising:
  maintain a stored first geofence definition defining a geographic area associated with a first criminal organization;
  receive, via the one or more transceivers, one or more audio and/or video streams or RF identifiers from one or more audio, video, and/or RF identifier recording devices located outside of the first geofence definition or having a field-of-view outside of the first geofence definition;
  detect, via the one or more audio and/or video streams or RF identifiers, an out-of-boundary condition in which an individual determined to be associated with the first criminal organization is detected outside of the first geofence definition;
  responsive to detecting the out-of-boundary condition, cause an electronic notification of the out-of-boundary condition to be one of output at the electronic computing device and transmitted, via the one or more transceivers, to another computing device notifying the another computing device of the out-of-boundary condition; and
  maintain a second geofence definition defining a geographic area associated with a second criminal organization having a known adversarial relationship with the first criminal organization;
 wherein detecting the out-of-boundary condition further comprises detecting that the individual determined to be associated with the first criminal organization is both detected outside of the first geofence definition and detected within the second geofence definition.

\* \* \* \* \*